(12) United States Patent
Park et al.

(10) Patent No.: US 9,788,074 B2
(45) Date of Patent: Oct. 10, 2017

(54) MOBILE TERMINAL AND METHOD FOR CONTROLLING THE SAME

(71) Applicant: LG ELECTRONICS INC., Seoul (KR)

(72) Inventors: Soondong Park, Seoul (KR); Jaewoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/016,170

(22) Filed: Feb. 4, 2016

(65) Prior Publication Data

US 2017/0048591 A1    Feb. 16, 2017

(30) Foreign Application Priority Data

Aug. 11, 2015 (KR) .......................... 10-2015-0113434

(51) Int. Cl.
| | |
|---|---|
| H04N 21/482 | (2011.01) |
| H04N 21/485 | (2011.01) |
| G06F 3/0482 | (2013.01) |
| G06F 3/0488 | (2013.01) |

(Continued)

(52) U.S. Cl.
CPC ....... *H04N 21/4858* (2013.01); *G06F 3/0482* (2013.01); *G06F 3/04845* (2013.01); *G06F 3/04847* (2013.01); *G06F 3/04883* (2013.01); *H04L 65/1059* (2013.01); *H04L 65/4015* (2013.01); *H04L 65/4084* (2013.01);

(Continued)

(58) Field of Classification Search
None
See application file for complete search history.

(56) References Cited

U.S. PATENT DOCUMENTS

2006/0236342 A1* 10/2006 Kunkel ............. H04N 5/44543
725/52
2007/0229706 A1   10/2007 Watanabe et al.
(Continued)

FOREIGN PATENT DOCUMENTS

| | | |
|---|---|---|
| WO | 2009/122372 | 10/2009 |
| WO | 2015/048457 | 4/2015 |

OTHER PUBLICATIONS

European Patent Application No. 16001575.6, Search Report dated Dec. 6, 2016, 13 pages.

*Primary Examiner* — Pankaj Kumar
*Assistant Examiner* — Charles N Hicks
(74) *Attorney, Agent, or Firm* — Lee, Hong, Degerman, Kang & Waimey

(57) ABSTRACT

A mobile terminal may continuously provide information corresponding to video data included in a region selected from a reproduction screen, even though outputting of the reproduction screen output on a touch screen is limited. The mobile terminal includes a touch screen configured to output a reproduction screen corresponding to video data, a user input unit configured to receive a user input limiting outputting of the reproduction screen, and a controller configured to output list information regarding a plurality of preset regions included in the reproduction screen when the user input is received, and extract video data corresponding to a selected region on the basis of a touch applied to the list information, wherein the controller may form a control command for outputting summary information corresponding to the extracted video data over time.

19 Claims, 18 Drawing Sheets

(51) Int. Cl.

| | | |
|---|---|---|
| *G06F 3/0484* | (2013.01) | |
| *H04N 21/81* | (2011.01) | |
| *H04N 21/41* | (2011.01) | |
| *H04N 21/422* | (2011.01) | |
| *H04N 21/4223* | (2011.01) | |
| *H04N 21/431* | (2011.01) | |
| *H04L 29/06* | (2006.01) | |
| *H04N 21/44* | (2011.01) | |
| *H04N 21/4402* | (2011.01) | |
| *H04N 21/4728* | (2011.01) | |
| *H04N 21/414* | (2011.01) | |
| *H04N 21/43* | (2011.01) | |
| *H04N 21/442* | (2011.01) | |
| *H04N 21/4788* | (2011.01) | |

(52) U.S. Cl.
CPC ..... *H04L 65/4092* (2013.01); *H04N 21/4126* (2013.01); *H04N 21/41407* (2013.01); *H04N 21/4223* (2013.01); *H04N 21/42224* (2013.01); *H04N 21/4307* (2013.01); *H04N 21/4312* (2013.01); *H04N 21/4316* (2013.01); *H04N 21/4318* (2013.01); *H04N 21/44008* (2013.01); *H04N 21/44218* (2013.01); *H04N 21/440245* (2013.01); *H04N 21/4728* (2013.01); *H04N 21/4788* (2013.01); *H04N 21/8133* (2013.01); *G06F 2203/04808* (2013.01)

(56) References Cited

U.S. PATENT DOCUMENTS

| | | | |
|---|---|---|---|
| 2012/0019732 A1* | 1/2012 | Lee | G06F 17/30274 348/732 |
| 2013/0155325 A1 | 6/2013 | Ramamurthy et al. | |
| 2016/0182924 A1* | 6/2016 | Todd | H04N 21/2343 725/116 |

* cited by examiner

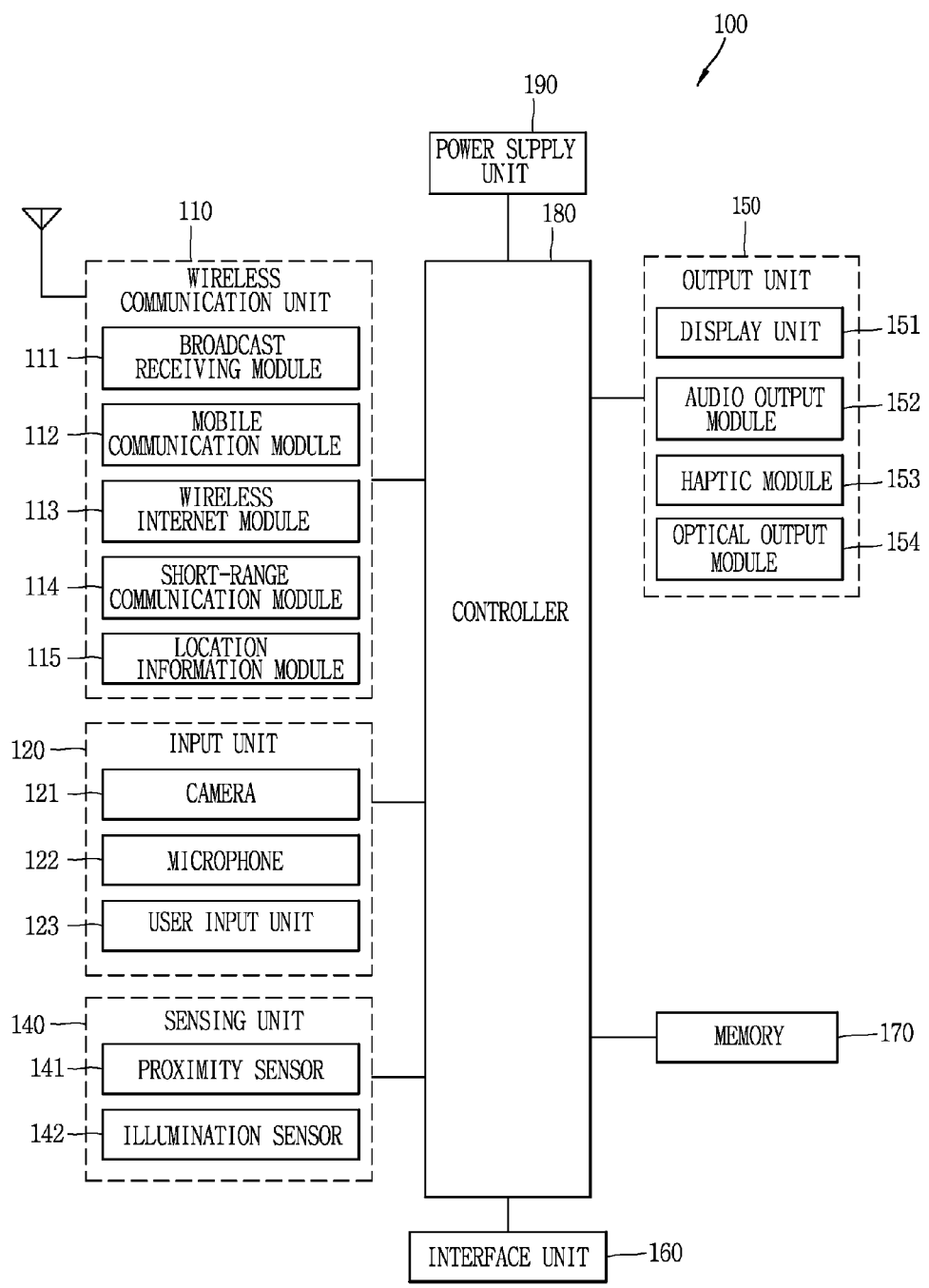

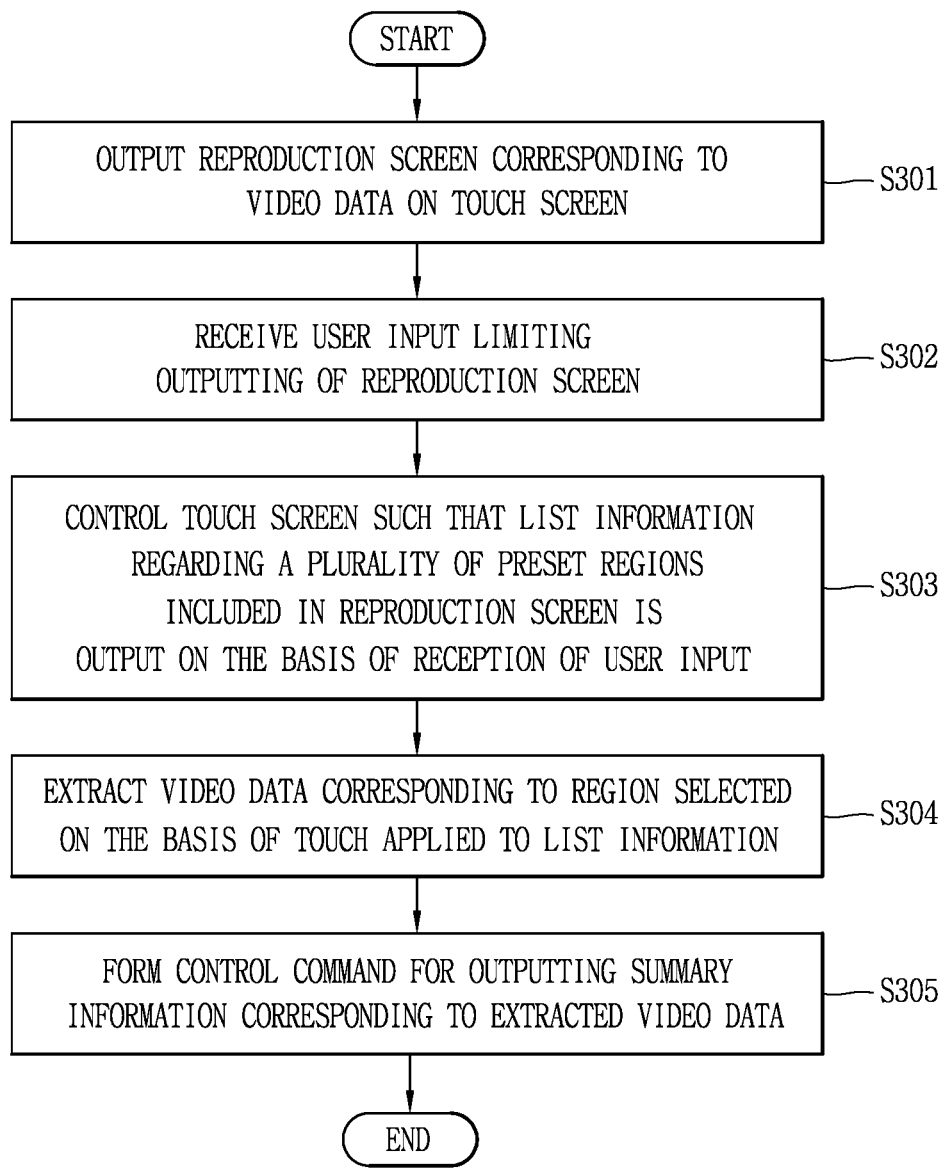

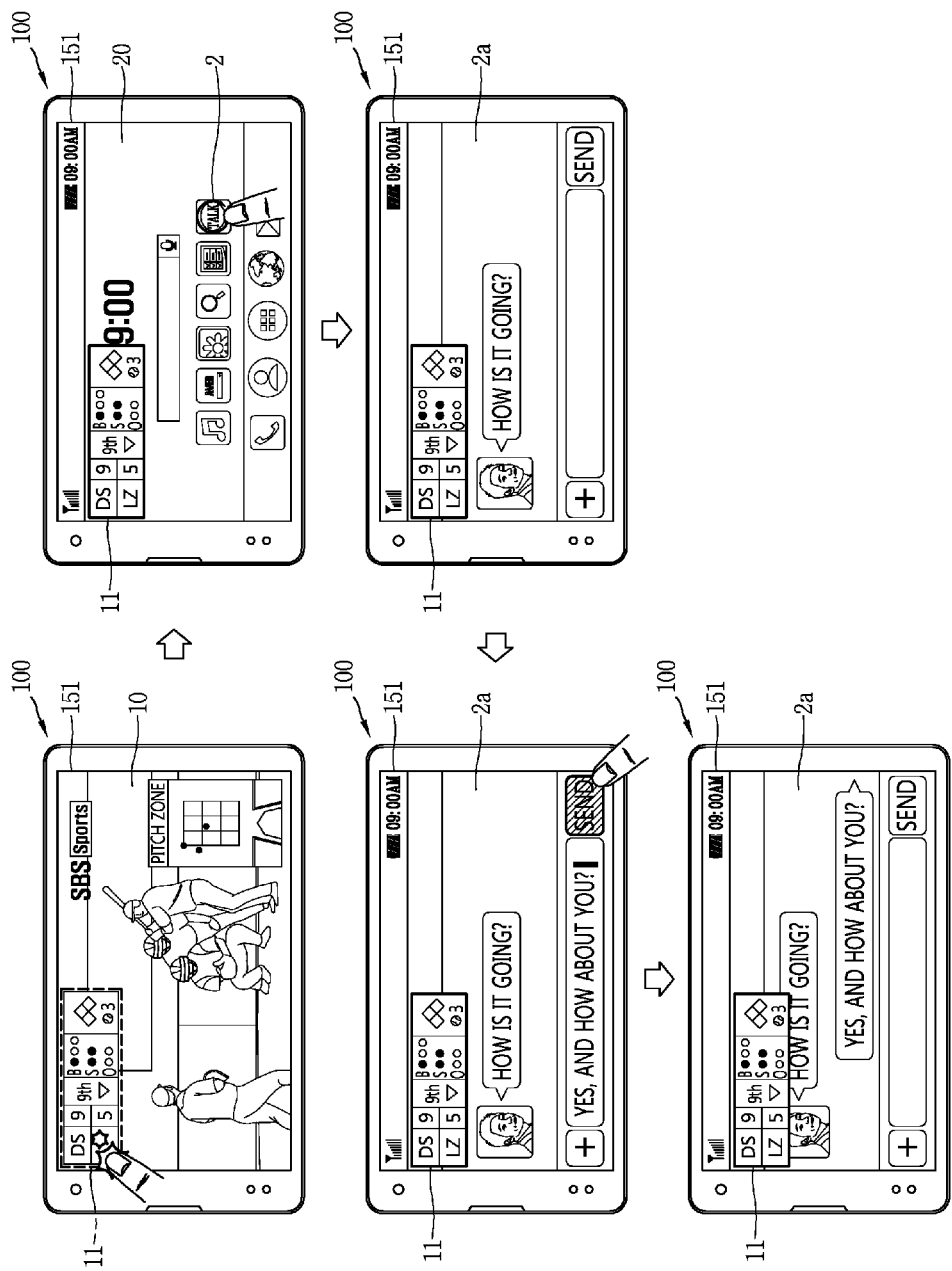

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2015-0113434, filed on Aug. 11, 2015, the contents of which are hereby incorporated by reference herein in its entirety.

BACKGROUND OF THE INVENTION

1. Field of the Invention

The present disclosure relates to a mobile terminal that outputs video data and a method for controlling the same.

2. Background of the Invention

Mobile terminals may be configured to perform various functions. Such various functions of mobile terminals may include, for example, a data and voice communication function, a function of capturing an image or video, a voice storage function, a function of reproducing or playing a music file, and a function of displaying an image or video. Some mobile terminals may include an additional function of executing games, while other mobile terminals may be implemented as multimedia devices. In addition, recent mobile terminals may receive broadcast or multicast signals to allow for viewing of video or television programs.

Efforts are ongoing to support and increase the functionality of mobile terminals. Such efforts include software and hardware improvements, as well as changes and improvements in the structural components.

Mobile terminals may output various types of visual information on a display unit (or a touch screen). In particular, the mobile terminal may output video data streamed in real time through an external server or previously stored video data so that a user may view a desired video even through the mobile terminal.

However, since the output image is continuously changed as time passes, when a user cannot continuously view a video through the mobile terminal, the user should temporarily stop the video or terminate an output thereof, and thereafter, the user should output the video again to view it.

SUMMARY OF THE INVENTION

Therefore, an aspect of the detailed description is to provide a mobile terminal capable of continuously providing video data information regarding a region of a reproduced screen selected by a user to the user even though output of the reproduced screen corresponding to video data is limited, and a method for controlling the same.

To achieve these and other advantages and in accordance with the purpose of this specification, as embodied and broadly described herein, a mobile terminal may include: a touch screen configured to output a reproduction screen corresponding to video data; a user input unit configured to receive a user input limiting outputting of the reproduction screen; and a controller configured to output list information regarding a plurality of preset regions included in the reproduction screen when the user input is received, and extract video data corresponding to a selected region on the basis of a touch applied to the list information, wherein the controller may form a control command for outputting summary information corresponding to the extracted video data over time.

In an embodiment of the present disclosure, the plurality of preset regions may be regions related to at least one of a region in which an output state is changed over time, a region set on the basis of a touch applied to the touch screen while the reproduction screen is being output, and a region in which a specific visual information is output.

In an embodiment of the present disclosure, the mobile terminal may further include: a wireless communication unit configured to perform wireless communication with an external terminal, wherein the control command may be formed to output the summary information from at least one of the touch screen and the external terminal, while limiting outputting of the reproduction screen.

In an embodiment of the present disclosure, the controller may form the summary information by converting a type of the extracted video data or by changing an attribute of visual information corresponding to the extracted video data.

In an embodiment of the present disclosure, the summary information may be a graphic object including at least a portion of visual information corresponding to the extracted video data.

In an embodiment of the present disclosure, the controller may control the touch screen such that the graphic object is output to a position of the selected region and has a size corresponding to a size of the selected region, when outputting of the reproduction screen is terminated.

In an embodiment of the present disclosure, when an execution screen corresponding to a function different from a function corresponding to the video data is output on the basis of a request for executing the different function, the controller may control the touch screen such that outputting of the graphic object is maintained on the execution screen corresponding to the different function.

In an embodiment of the present disclosure, the controller may control the touch screen such that the graphic object is output on or disappears from the execution screen of the different function on the basis of a preset period.

In an embodiment of the present disclosure, the preset period may be a period at which an output state of the selected region is changed or a period at which a preset event occurs in relation to the reproduction screen.

In an embodiment of the present disclosure, when a specific touch is applied to the graphic object, the controller may extract a predetermined section including a point corresponding to a point in time at which the specific touch has been applied, from the video data, and control the touch screen to output a reproduction screen corresponding to video data of the extracted predetermined section.

In an embodiment of the present disclosure, the controller may control the wireless communication unit to transmit the control command to the external terminal and control the touch screen to display a control object corresponding to the external terminal, after the transmission of the control command.

In an embodiment of the present disclosure, the controller may control the wireless communication unit such that a control signal for changing an output state of the summary information is transmitted to the external terminal on the basis of a touch applied to the control object.

In an embodiment of the present disclosure, the control signal may determine at least one of an output period of the summary information, an output amount of the summary information, and an output form of the summary information in the external terminal.

In an embodiment of the present disclosure, the controller may control the wireless communication unit such that a control command for outputting summary information corresponding to a first region selected from the plurality of preset regions is transmitted to the external terminal, and after the control command for outputting the summary information corresponding to the first region is transmitted, when a specific touch is applied to the control object, the controller may control the wireless communication unit such that a control signal for outputting summary information corresponding to a second region different from the first region among the plurality of preset regions, instead of the summary information corresponding to the first region, is transmitted to the external terminal.

In an embodiment of the present disclosure, the mobile terminal may further include: a camera configured to sense user's eyes with respect to the touch screen, wherein when the user's eyes with respect to the touch screen are not sensed by the camera, the controller may control the wireless communication unit such that the control command is transmitted to the external terminal.

To achieve these and other advantages and in accordance with the purpose of this specification, as embodied and broadly described herein, a method for controlling a mobile terminal may include: outputting a reproduction screen corresponding to video data on a touch screen; receiving a user input for limiting outputting of the reproduction screen; when the user input is received, outputting list information regarding a plurality of preset regions included in the reproduction screen on the touch screen; extracting video data corresponding to a region selected on the basis of a touch applied to the list information; and forming a control command for outputting summary information corresponding to the extracted video data over time.

In an embodiment of the present disclosure, the plurality of preset regions may be regions related to at least one of a region in which an output state is changed over time, a region set on the basis of a touch applied to the touch screen while the reproduction screen is being output, and a region in which a specific visual information is output.

In an embodiment of the present disclosure, the control command may be formed to output the summary information from at least one of the touch screen and an external terminal performing wireless communication with the mobile terminal, while limiting outputting of the reproduction screen.

In an embodiment of the present disclosure, the summary information may be information formed as attribute information corresponding to the extracted video data is changed.

In an embodiment of the present disclosure, the summary information may be a graphic object including at least a portion of visual information corresponding to the in extracted video data.

As described above, in the mobile terminal and the control method thereof according to embodiments of the present disclosure, even when outputting of a reproduction screen corresponding to video data is limited, information included in an interested region selected by the user from the reproduction screen may be continuously provided to the user.

Thus, even in a situation in which the user cannot continuously reproduce the video data, the user may continuously check information regarding his or her interested region of the reproduction screen.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings:

FIG. 1A is a block diagram of a mobile terminal in accordance with the present disclosure.

FIG. 3A is a flow chart illustrating a control method of a mobile terminal according to an embodiment of the present disclosure.

FIGS. 6A, 6B, and 6C are views illustrating embodiments related to a case in which summary information is output on the mobile terminal.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
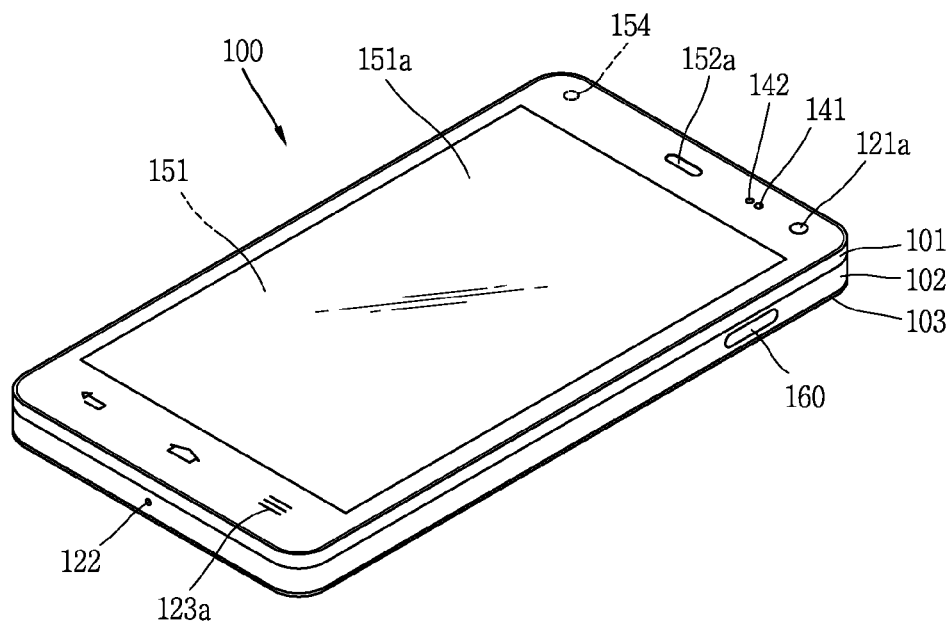
FIGS. 1B and 1C are conceptual views of one example of the mobile terminal, viewed from different directions.
Figure 1C:
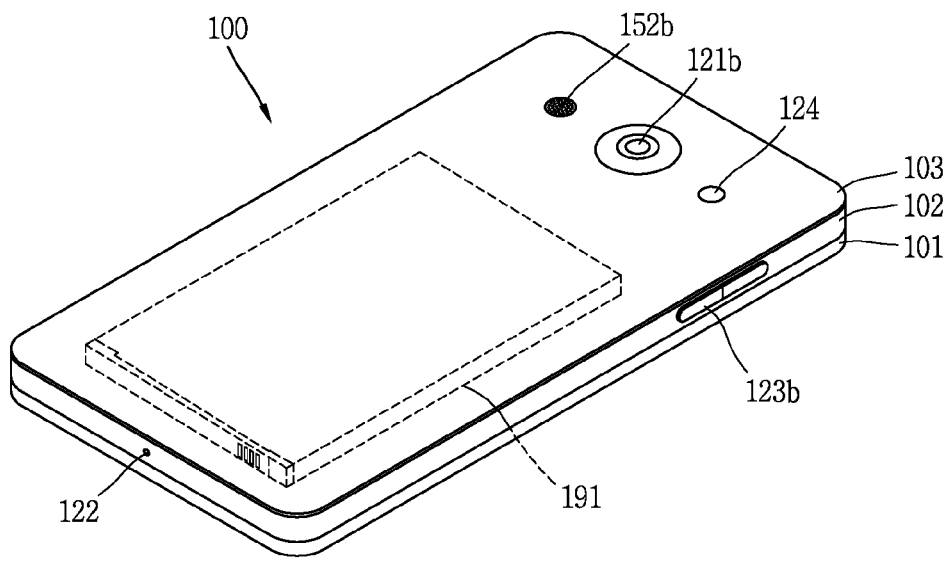

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit (or a controller) 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Figure 2:
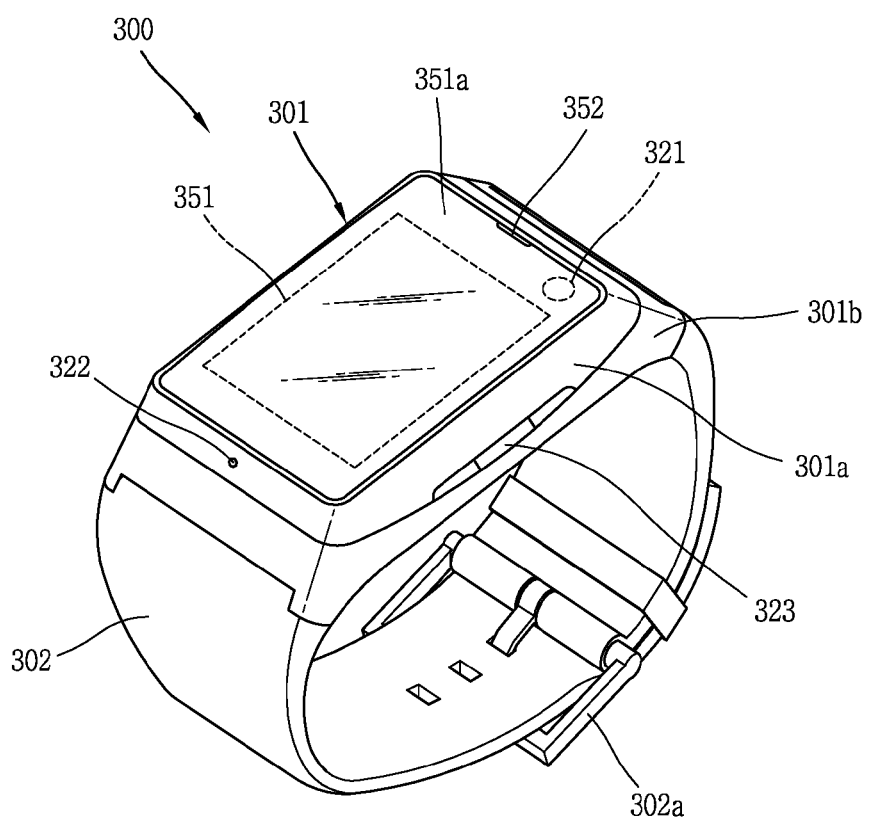
FIG. 2 is a perspective view illustrating an example of an external device 300 related to another embodiment of the present disclosure.

FIG. 2 is a perspective view illustrating one example of an external device 300 in accordance with another exemplary embodiment.

As illustrated in FIG. 2, the external device 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The external device 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

In a mobile terminal according to an embodiment of the present disclosure, even though output of a reproduced screen of a video is limited, video data corresponding to a region of the reproduced screen designated by the user as an interested region may be continuously provided to the user.

For example, in the mobile terminal according to an embodiment of the present in disclosure, video data corresponding to a region selected by the user may be extracted from among a plurality of preset regions on the reproduction screen. Also, even after outputting of the reproduction screen is terminated, information corresponding to the extracted video data may be output by using the mobile terminal or an external terminal wirelessly connected to the mobile terminal.

Thus, in a situation in which the user cannot view the reproduction screen, the user may be provided with user convenience that he or she can continuously check information regarding a specific region of the reproduction screen in which the user is interested.

Figure 3B:
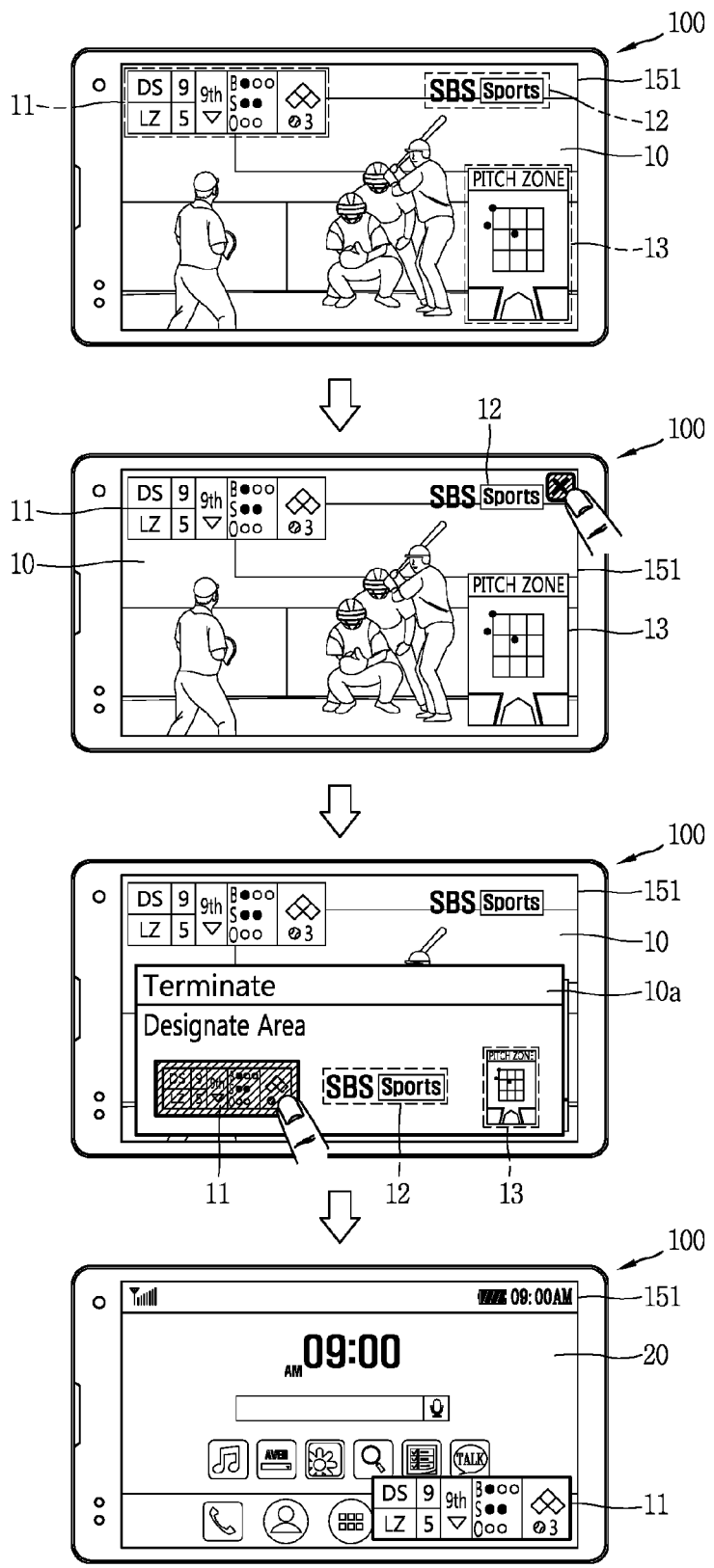
FIGS. 3B and 3C are views illustrating a control method of a mobile terminal according to an embodiment of the present disclosure.
Figure 3C:
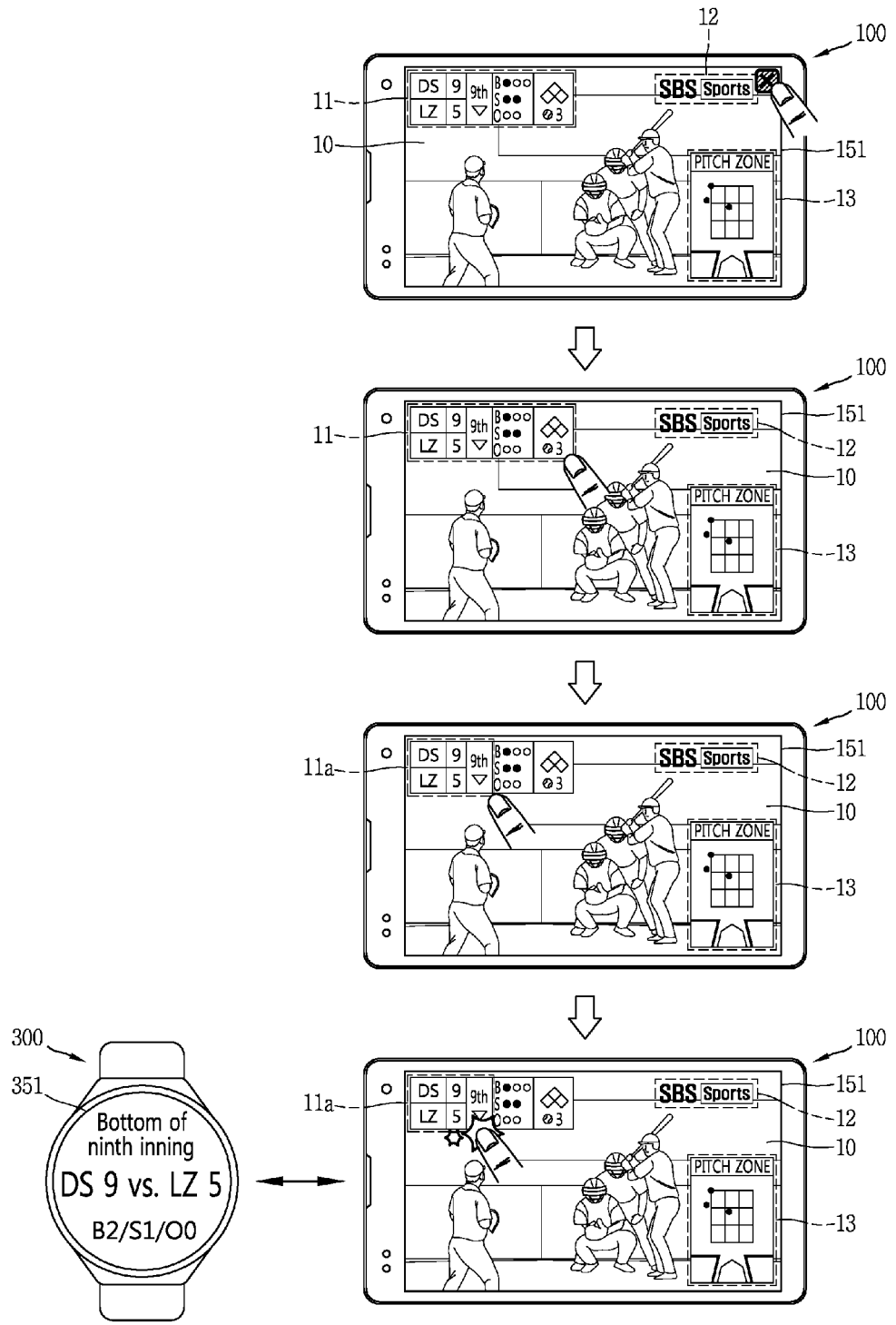

FIG. 3A is a flow chart illustrating a control method of a mobile terminal according to an embodiment of the present disclosure, and FIGS. 3B and 3C are views illustrating a control method of a mobile terminal according to an embodiment of the present disclosure.

First, referring to FIG. 3A, a reproduction screen corresponding to video data may be output on the touch screen of the mobile terminal according to an embodiment of the present disclosure in step S301.

The video data may be data including a plurality of images continued with the passage of time, and may be formed with various types of file extensions (for example, avi, wmv, mpg, and the like). Also, the video data may be data stored in the mobile terminal 100 or may be data streamed from an external server by the wireless communication unit 110 in real time.

That is, as illustrated in the first drawings of FIGS. 3B and 3C, a reproduction screen 10 corresponding to video data (for example, video data regarding a baseball game)

streamed in real time on the basis of a broadcast signal received from an external server may be output on the touch screen 151.

When there is a request for outputting the video data, the control unit 180 may control the touch screen 151 to output a plurality of images forming the video data over time. Here, the reproduction screen corresponding to the video data may be a screen corresponding to one image among the plurality of images continuously output on the basis of reproducing of the video data.

In the state in which the reproduction screen is output, a user input for limiting output of the reproduction screen may be received in step S302.

The user input may be received by the user input unit. Here, the user input unit may include any component for receiving a control command applied from the user.

For example, the touch screen 151 for applying a touch input applied from the user, the microphone 122 for receiving a user's voice command, a sensing unit 140 for sensing a user's gesture, and the like, may be included in the user input unit.

When the user input is received, the control unit 180 may limit outputting of the reproduction screen. Here, limiting outputting of the reproduction screen may refer to making at least one region of the reproduction screen disappear from the touch screen 151 or limiting reproducing of the video data corresponding to the reproduction screen.

In a specific example, the control unit 180 may control the touch screen 151 to output at least one region of the reproduction screen in a magnified manner on the basis of the user input and make the other remaining region of the reproduction screen disappear from the touch screen 151.

In another example, the control unit 180 may temporarily stop reproducing of the video data corresponding to the reproduction screen on the basis of a user input, and control the touch screen 151 to maintain outputting of the reproduction screen output on the touch screen 151 when reproducing of the video data is stopped.

In another example, on the basis of a user input, the control unit 180 may control the touch screen 151 to terminate reproducing of the video data on the basis of the user input and terminate outputting of the reproduction screen.

Here, the user input for limiting outputting of the reproduction screen may be variously set as a user input for pressing a hardware key installed in the main body of the mobile terminal 100 or a voice input for terminating outputting of the video data through the microphone 122.

Also, in an example, as illustrated in the second drawing of FIG. 3B and the first drawing of FIG. 3C, the user input may be a touch applied to an object corresponding to a function of terminating output of the reproduction screen 10 corresponding to the video data.

When the user input is received, the control unit 180 may control the touch screen 151 to output list information regarding a plurality of preset regions included in the reproduction screen in step S303.

Here, the preset region may refer to an type of region that may be designated as an interested region by the user in the reproduction screen.

For example, the preset region may be a region in which an output state is changed over time in the reproduction screen. In a specific example, the preset region may be a region in which visual information such as a character or image information is changed at least one or more times in the reproduction screen while the video data is being reproduced.

That is, as illustrated in the first drawing of FIG. 3B, the control unit 180 may determine regions in which visual information is changed over time in the reproduction screen 10, as preset regions 11 and 13. The preset regions 11 and 13 may be regions in which a score state and pitch related information are changed as a baseball game is in progress.

In another example, the preset region may be a region set by a touch applied to the touch screen 151 while a reproduction screen corresponding to the video data is being output. In a more specific example, the preset region may be a region of the reproduction screen in which resolution thereof is changed on the basis of the touch in a state in which the reproduction screen is output. That is, in a case in which a region of the reproduction screen is enlarged, the one region may be included in the region set on the basis of the touch. Alternatively, a remaining region which has disappeared from the touch screen 151 on the basis of magnification of one region of the reproduction screen may be included in the preset region on the basis of the touch.

Also, in a case in which a preset type of touch (for example, a pinch out or drag input, a tap input for a preset number of times, and the like) is applied to a predetermined range of the reproduction screen, a region corresponding to the predetermined range may be the preset region on the basis of the touch.

In another example, the preset region may be a region in which specific information is output while the video data is being reproduced. In a specific example, the specific information may include a preset specific type of information (for example, text information or image information) or visual information corresponding to a preset object (an image of a person or an object excluding a background, a character, and the like).

That is, as illustrated in the second drawing of FIG. 3B, a region in which specific visual information (SBS sports) is output in the reproduction region 10 may be determined as a preset region. Here, output of the specific visual information may be uniformly maintained without being changed over time in the preset region.

In this manner, when the plurality of preset regions are determined, the control unit 180 may control the touch screen 151 to output list information regarding the plurality of preset regions.

The list information may be a list screen including thumbnail images respectively corresponding to the plurality of preset regions. That is, as illustrated in the third drawing of FIG. 3B, the list information may be output in the form of a list screen 10a including a thumbnail image respectively corresponding to the plurality of preset regions 11, 12, and 13.

Alternatively, the list information may be output as identification display information regarding each of the plurality of preset regions on the reproduction screen.

That is, as illustrated in the second drawing of FIG. 3C, the list information may be output as identification display information by applying a specific visual effect (for example, drawing borders in a dotted line or shading with preset brightness) to each of the plurality of preset regions 11, 12, and 13 included in the reproduction screen 10.

After the list information is output, the control unit 180 may extract video data corresponding to a region selected on the basis of a touch applied to the list information among the plurality of preset regions in step S304.

That is, on the basis of the touch, the control unit 180 may select at least one of a plurality of preset regions, and extract video data corresponding to the selected region. Here, the video data corresponding to the selected region may be video data corresponding to a portion output in the selected region as the video data is reproduced.

For example, the video data corresponding to the selected region may include any type of visual information (such as character or image information) output on the selected region. In a specific example, caption information, graphic object information, logo information, and the like, output on the selected region may be included in the video data corresponding to the selected region.

In another example, the video data corresponding to the selected region may include any type of hearing information related to the visual information output in the specific region. That is, the hearing information output together with the visual information may also be included in the video data corresponding to the selected region.

Meanwhile, a touch with respect to the list information may be a touch for selecting at least one of the plurality of preset regions. For example, the touch may be a touch applied to one thumbnail image 11 included in the list screen 10a as illustrated in the third drawing of FIG. 3B.

Also, for example, as illustrated in the third drawing of FIG. 3C, the touch may be a drag touch applied to at least a portion 11a of the preset region 11. In this case, only video data corresponding to at least one portion 11a of the preset region 11 may be extracted.

In this manner, after the video data corresponding to the selected region is extracted, the control unit 180 may form a control command for outputting summary information corresponding to the extracted video data over time in step S305.

The summary information may be information corresponding to at least a portion of the visual information and the hearing information output over time in the selected region when the video data is reproduced, which may be formed by at least a portion of the extracted video data. The control unit 180 may form the summary information by using attribute information corresponding to the extracted video data.

For example, the control unit 180 may form the summary information by changing attribute information corresponding to the extracted video data.

In a specific example, the control unit 180 may form the summary information by changing a file extension corresponding to the extracted video data into a different file extension. In another example, the control unit 180 may form the summary information by converting a type of data corresponding to the extracted video data into different data. That is, the control unit 180 may form the summary information by converting visual information included in the extracted video data into hearing information.

Also, the control unit 180 may form the summary information by changing an attribute of the visual information corresponding to the extracted video data. For example, the control unit 180 may form a graphic object including at least a portion of the visual information corresponding to the extracted video data, as the summary information.

In another example, in a case in which the visual information corresponding to the extracted video data is image information, the control unit 180 may form the summary information by using a still cut image of a portion of the images forming the image information.

In another example, the control unit 180 may form the summary information by changing resolution of image information corresponding to the extracted video data or by changing text information corresponding to the extracted video data into image information.

Hereinafter, an embodiment related to summary information corresponding to the extracted video data will be described with reference to FIGS. 5A, 5B, and 5C hereinafter.

When the summary information is formed in this manner, the control unit 180 may generate a control command for outputting the summary information over time, while limiting outputting of the reproduction screen on the touch screen 151.

In detail, the control command may be formed to output the summary information on at least one of the touch screen 151 and the external terminal performing wireless communication with the mobile terminal 100, while limiting outputting of the reproduction screen.

Also, the control command may be formed to determine an output size, a range, a position, and an output period of the summary information in at least one of the touch screen 151 and the external terminal.

For example, when the summary information corresponding to the video data extracted from any one preset region 11 is formed as illustrated in the third drawing of FIG. 3B, the control unit 180 may form a control command for outputting the summary information on the touch screen 151 as illustrated in the fourth drawing of FIG. 3B. Here, the control command may be formed to enable the summary information to be output in a form of a floated graphic object on the touch screen 151.

In another example, the control command may be a command for controlling the wireless communication unit 110 to perform wireless communication with a preset external terminal. That is, as illustrated in the fourth drawing of FIG. 3C, when a portion 11a of the any one preset region 11 is designated and a preset input (for example, a double tap input) is applied to the touch screen 151, the control unit 180 may transmit the formed summary information to the external terminal 300 by using video data extracted from the portion 11a. Here, the summary information may be information obtained by changing an attribute of visual information corresponding to the video data extracted from the portion 11a, and may be output on the display unit 351.

In this manner, even though outputting of the reproduction screen is limited, video data corresponding to a region designated as an interested region by the user in the reproduction screen may be provided to the user through at least one of the same terminal or the external terminal. Thus, even though outputting of the reproduction screen is terminated, the user may be continuously provided with information corresponding to video data output over time in the selected region of the reproduction screen.

Meanwhile, the control unit 180 may select at least one of the plurality of preset regions when a preset condition is met. Here, the preset condition may be related to at least one of a touch applied to the list information regarding the plurality of preset regions and a specific output state of a region in which an output state is changed over time and the preset region (for example, specific resolution of visual information included in the preset region, an output time of specific visual information output in the preset region, and the like). Embodiments related thereto will be described with reference to FIGS. 4A, 4B, and 4C hereinafter.

Figure 4A:
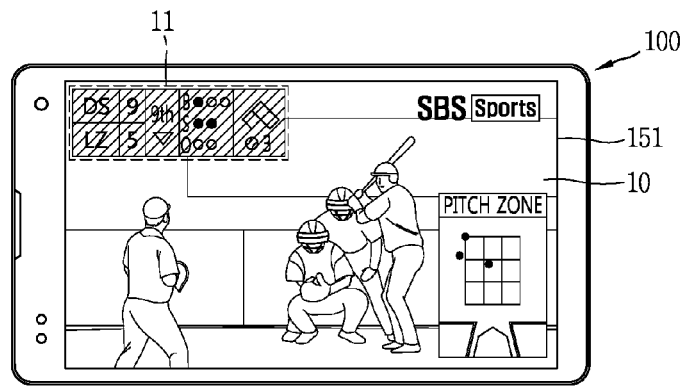
FIGS. 4A, 4B, and 4C are views illustrating an embodiment related to determination of a specific region.
Figure 4B:
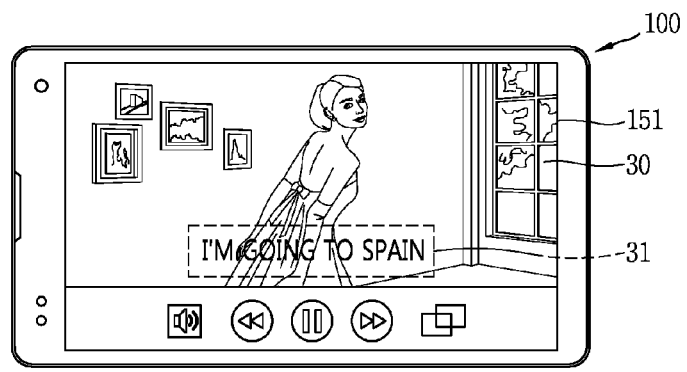
Figure 4C:
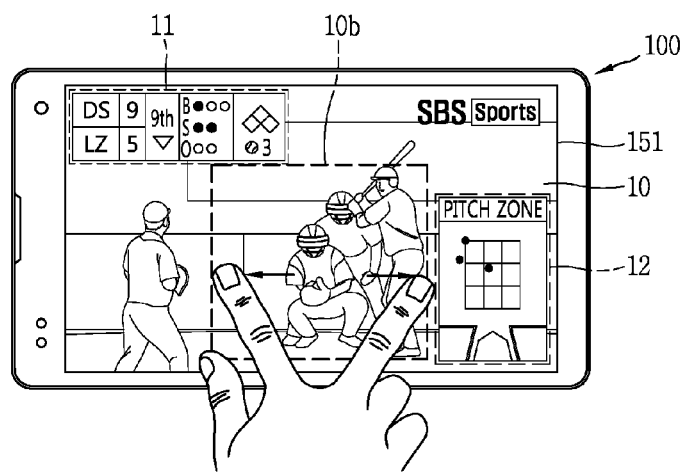

FIGS. 4A, 4B, and 4C are views illustrating embodiments related to determination of the specific region.

First, referring to FIG. 4A, a reproduction screen 10 corresponding to video data streamed in real time on the basis of a broadcast signal received from the external server may be output on the touch screen 151. The control unit 180 may determine a plurality of preset regions in the reproduction screen 10.

The plurality of preset regions may include a region in which an output state is changed over time. In this case, the control unit 180 may determine a region having resolution equal to or lower than a preset reference, among regions in which an output state is changed over time, as the selected region (that is, a region designated as an interested region by the user).

That is, when a screen of a baseball game is output as a reproduction screen as illustrated in FIG. 4A, a region displaying score information regarding the baseball game, a region related to pitch information, and the like, may be included in the plurality of preset regions. In this case, the control unit 180 may determine a region 11 having resolution equal to or lower than the preset reference, among the plurality of preset regions, as the selected region.

In another example, referring to FIG. 4B, a reproduction screen 30 corresponding to specific video data may be output on the touch screen 151. The control unit 180 may select a region on which specific object information (an image of a person or an object excluding a background, a character, or the like), from a plurality of preset regions included in the reproduction screen 30.

That is, as illustrated in FIG. 4B, a region in which caption information 31 corresponding to a specific character object is output in a region of the reproduction screen 30 may be determined as the selected region.

Alternatively, as illustrated in FIG. 4C, when a specific touch is applied to the reproduction screen 10 by the user, outputting with respect to at least one region of the reproduction screen 10 may be limited by the specific touch. For example, the other remaining region of the reproduction screen 10 may disappear from the touch screen 151 on the basis of the specific touch that magnifies one region 10b of the reproduction screen 10. Also, as the one region is magnified, it may be output to have a resolution different from the originally output resolution.

In this case, the control unit 180 may determine the regions 11 and 12 in which an output state is changed over time as the selected regions, in the remaining region which disappears from the touch screen 151. Alternatively, the control unit 180 may determine a region whose resolution is changed on the basis of a specific touch applied by the user, as the selected region 10b.

In this manner, the control unit 180 may immediately select a user interested region among the plurality of preset regions included in the reproduction screen on the basis of the preset condition. Thus, the user may directly designate the desired region whenever outputting of the reproduction screen is limited, or may register the preset condition in advance and may be quickly and easily provided with information related to the user interested region.

Also, when the selected region is determined, the control unit 180 may form summary information corresponding to the selected region by using video data extracted from the selected region. That is, the control unit 180 may form the summary information by changing an attribute of the extracted video data by using the meta data corresponding to the extracted video data.

Figure 5A:
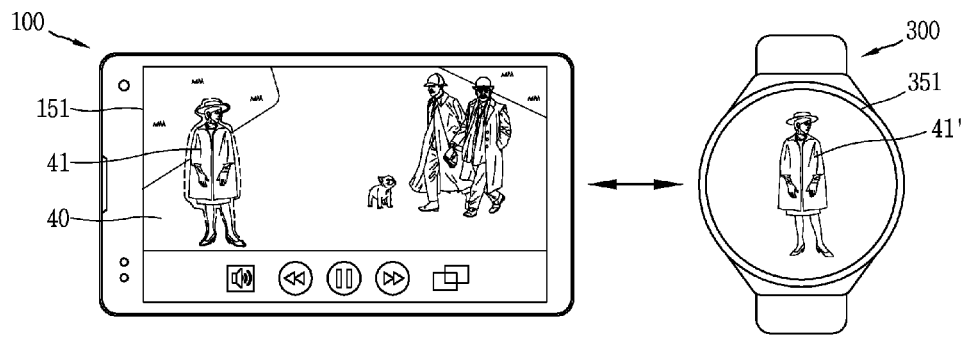
FIGS. 5A, 5B, and 5C are views illustrating embodiments of various forms of summary information.
Figure 5B:
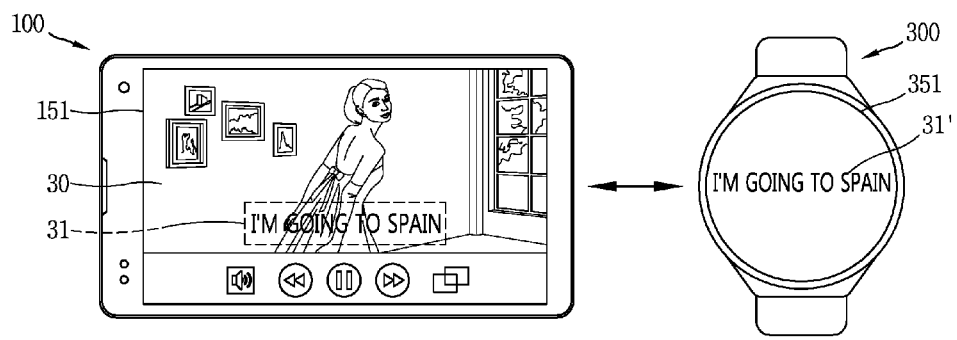
Figure 5C:
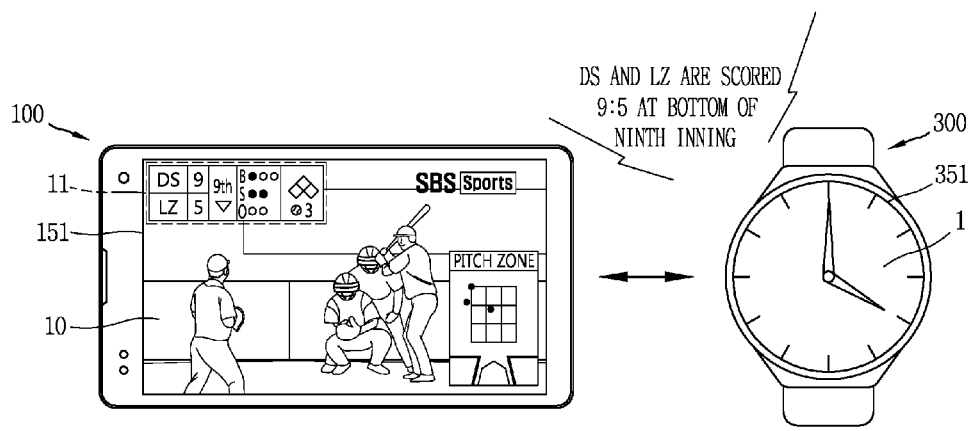

FIGS. 5A, 5B, and 5C are views illustrating an embodiment regarding various forms of summary information.

First, referring to FIG. 5A, a region of the reproduction screen 40 output on the touch screen 151, in which one object 41 is output, may be determined as the selected region. In this case, the control unit 180 may form the summary information by using video data related to one object among video data extracted from the selected region.

For example, the control unit 180 may form a plurality of still cut images over time by using video data related to the one object. Also, the control unit 180 may form partial streaming data by using a portion of video data related to the object in the extracted video data.

Also, the control unit 180 may form a control command for outputting the formed summary information to output the summary information related to the object on the display unit 351 of the external terminal 300.

Also, as illustrated in FIG. 5B, when the region in which an output state is continuously changed (for example, a region in which caption information is output) in one region 31 of the reproduction screen 30 is determined as the selected region, the control unit 180 may extract video data from the selected region 31. Also, the control unit 180 may change an attribute of visual information corresponding to the video data extracted from the selected region 31.

For example, in a case in which the visual information is formed as image information corresponding to specific caption contents, the control unit 180 may extract caption contents corresponding to the image information and form character information using the caption contents as the summary information. Thus, the character information corresponding to the caption information may be output on the display unit 351 of the external terminal 300.

In another example, as illustrated in FIG. 5C, the control unit 180 may extract video data corresponding to the selected region 11 among video data streamed in real time through an external server. Also, the control unit 180 may form hearing information corresponding to the visual information by changing an attribute of the visual information corresponding to the extracted video data 11. The hearing information may be output on the external terminal 300.

In this manner, the control unit 180 may output the summary information in a form appropriate for the current state of the mobile terminal 100 or the external terminal 300 by changing the attribute of the extracted video data.

Hereinafter, embodiments related to a case in which the summary information is output on the mobile terminal 100 or the external terminal 300 will be described.

Figure 6B:
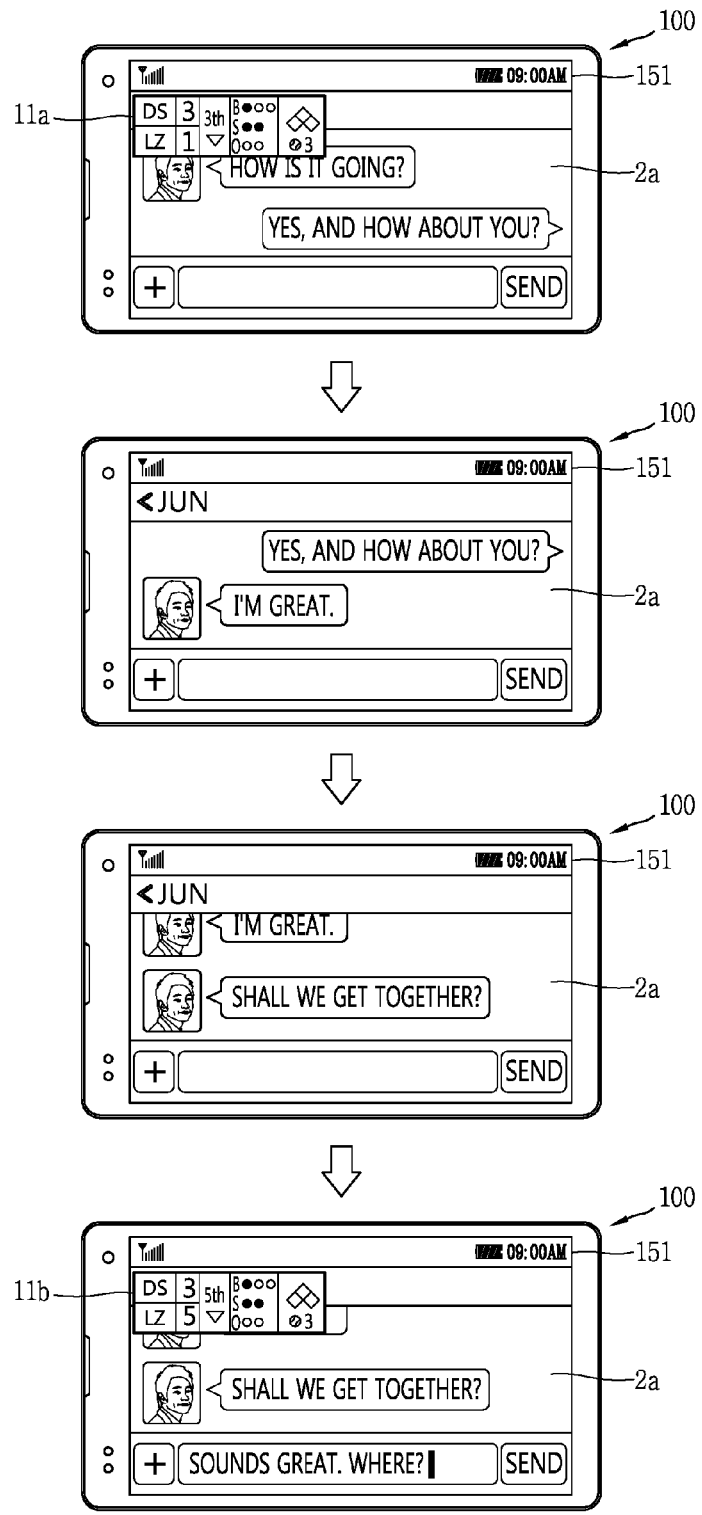
Figure 6C:
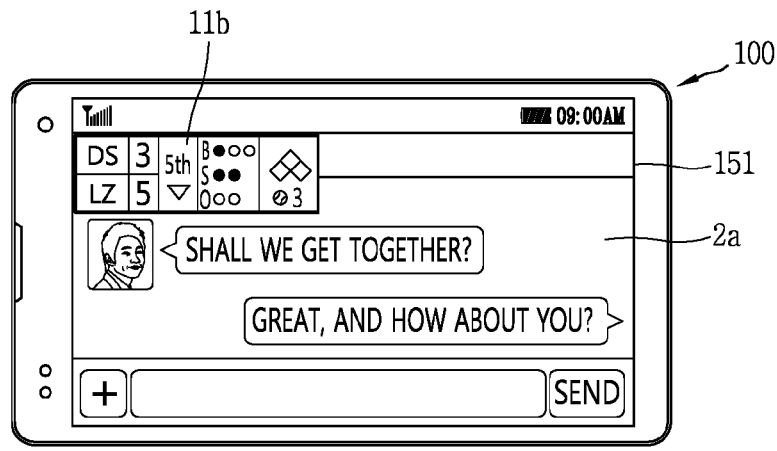
Figure 6C:
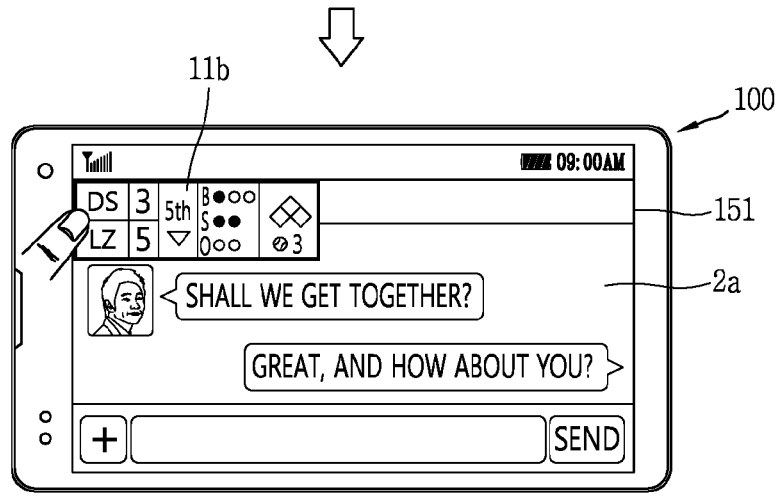
Figure 6C:
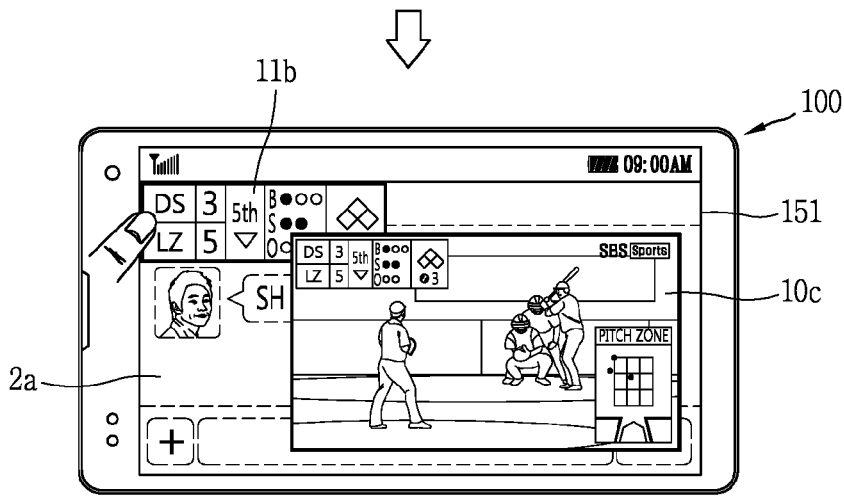

FIGS. 6A, 6B, and 6C are views illustrating embodiments related to a case in which summary information is output on the mobile terminal.

First, referring to FIG. 6A, on the basis of a preset type of touch applied to the region 11 selected from the reproduction screen 10 output on the touch screen 151, video data may be extracted from the selected region 11. Also, the control unit 180 may form summary information by using the extracted video data. For example, the summary information may be a graphic object including at least a portion of visual information corresponding to the video data output in the selected region.

When the summary information is formed, the control unit 180 may form a control command for outputting the summary information. The control command may determine an output state of the summary information such as an output period, an output scheme, and the like, of the summary information. For example, as illustrated in the second drawing of FIG. 6A, the control command may be a command for enabling the summary information 11 to be output at a position corresponding to the selected region such that the summary information 11 has the same size as that of the selected region in the touch screen 151.

Also, the control command may determine an output state such that outputting of the summary information 11 is maintained in one region of the touch screen 51. As illustrated in the second drawing of FIG. 6A, even when outputting of the reproduction screen 10 is terminated and a home screen page 20 is output on the touch screen 151, outputting of the summary information 11 may be maintained.

Also, as illustrated in the third drawing of FIG. 6A, on the basis of a request for executing a function different from the function corresponding to the video data, the control unit 180 may output an execution screen 2a corresponding to the different function on the touch screen 151. Also, in a state in which the execution screen 2a corresponding to the different function is output, the control unit 180 may control the touch screen 151 such that outputting of the summary information 11 is maintained.

Thereafter, when execution of the specific application is maintained on the basis of a touch applied to the touch screen 151 as illustrated in the fourth drawing of FIG. 6A, outputting of the summary information may be maintained in a floated manner on the execution screen 2a of the specific application.

Also, the control unit 180 may control the touch screen 151 such that the summary information is output or disappears on the basis of a preset period. That is, referring to FIG. 6B, the control unit 180 may form a control command for determining an output period of the summary information ha on the execution screen 2a of the different function.

Here, the preset period may be related to at least one of a period at which the output state of the selected region is changed and a period at which a preset event occurs in relation to the reproduction screen. In a more specific example, the control unit 180 may form the control command such that the summary information is output on the basis of a change in the output of the visual information corresponding to the selected region.

In another example, in a case in which preset specific information (for example, specific caption information or advertisement information in relation to the reproduction screen) is output on the reproduction screen or in a case in which the reproduction screen in a preset output state (for example, a change in resolution, a temporarily stopped state, or the like), the control unit 180 may determine that the preset event has occurred.

In this manner, when the preset period is determined, the control unit 180 may control an output state of the summary information on the basis of the preset period. Thus, as illustrated in the first drawing of FIG. 6B, in a state in which the summary information 11a is output, as time goes by, the summary information 11a may disappear from the touch screen 151 while the different function is being executed, as illustrated in the second and third drawings of FIG. 6B.

Also, when an output state of the visual information corresponding to the specific region is changed, visual information 11b corresponding to the changed output state may be output again on the execution screen 2a of the different function.

In this manner, since the summary information is output under the preset condition, the user may execute a different function without being interfered, and only in a specific case in which an output state of the selected region corresponding to the summary information is changed, the user may check the summary information output again.

Also, in a state in which the summary information is output, the control unit 180 may provide a reproduction screen regarding a video data section related to a point in time at which the specific touch is applied.

That is, referring to FIG. 6C, in a state in which the summary information 11b is output on the execution screen 2a corresponding to the different function output on the touch screen 151, and a specific touch (for example, a long touch applied for more than a preset period of time, etc.) may be applied to the summary information 11b as illustrated in the second drawing of FIG. 6C.

In this case, the control unit 180 may extract a predetermined section including a point corresponding to a point in time at which the specific touch has been applied, from the video data. For example, in a case in which the video data is video data streamed in real time on the basis of a broadcast signal received from an external server, the control unit 180 may extract partial streamed video data including the point corresponding to the point in time at which the specific touch has been applied.

Also, as illustrated in the third drawing of FIG. 6C, the control unit 180 may control the touch screen 151 to output a reproduction screen 10c corresponding to the video data of the predetermined extracted section, while the specific touch is being maintained. For example, the reproduction screen 10c corresponding to the video data of the predetermined extracted section may be output on the execution screen 2c of the different function in an overlapping manner.

Thus, the user may be provided with the summary information whose output state is changed in at least one region of the reproduction screen, and when the user applies a specific touch to the summary information, the user may be easily provided with overall video information related to the summary information.

Meanwhile, the control unit 180 may form the control command such that the summary information may be output on the external terminal wirelessly connected with the mobile terminal 100.

Figure 7A:
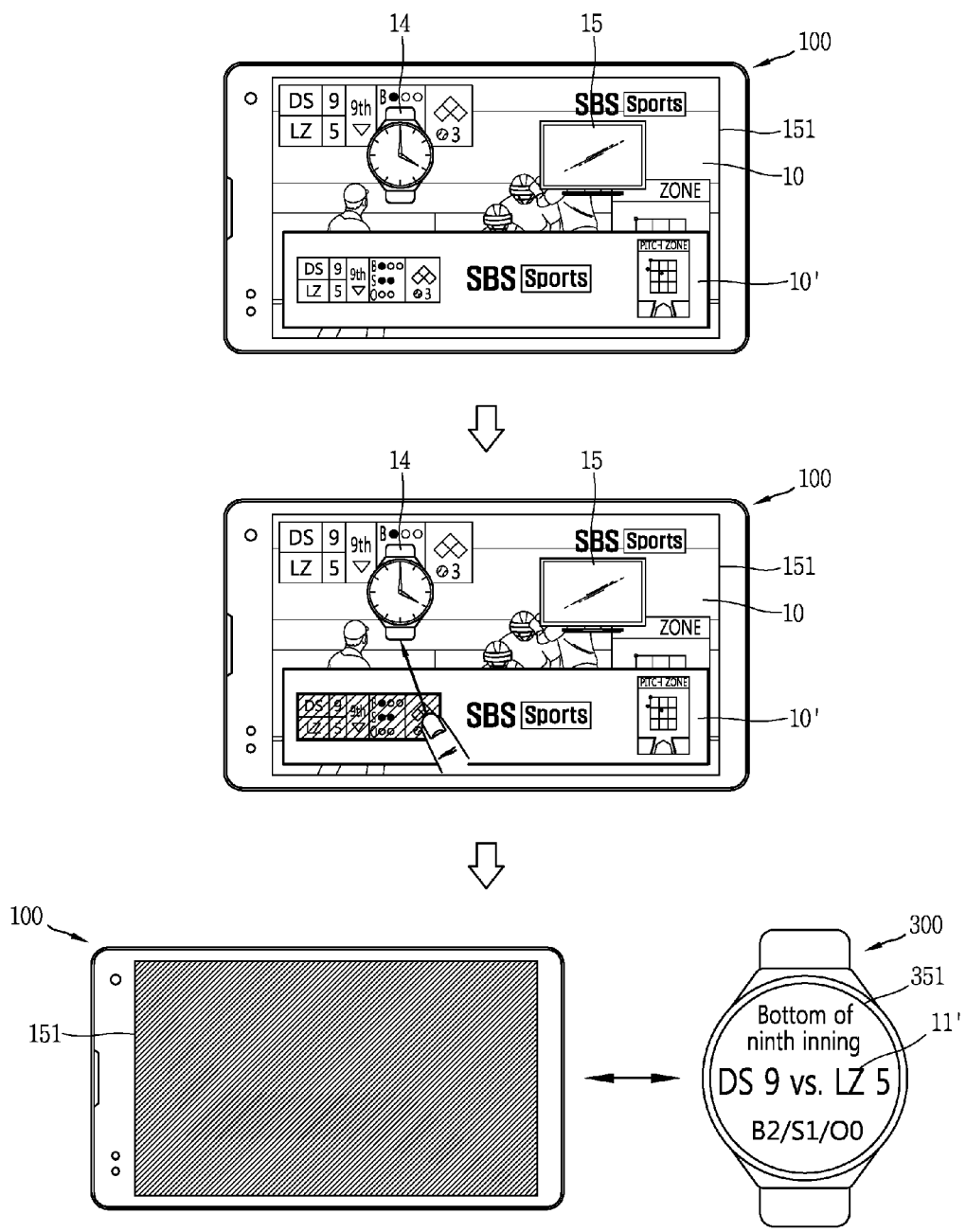
FIGS. 7A and 7B are views illustrating embodiments of a case in which summary information is output on an external terminal.
Figure 7B:
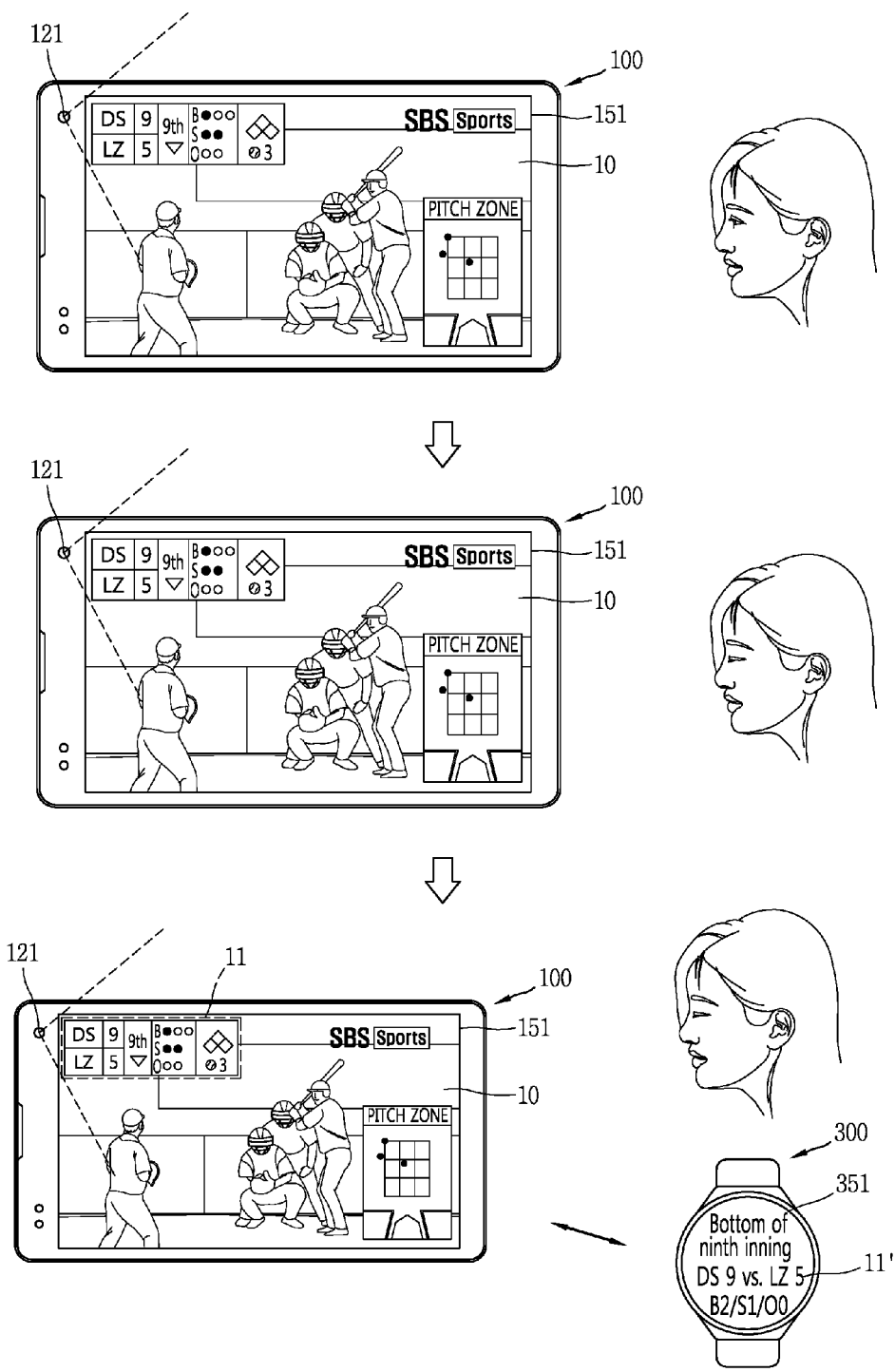

FIGS. 7A and 7B are views illustrating embodiments of a case in which summary information is output on an external terminal.

First, referring to FIG. 7A, a reproduction screen 10 is output on the touch screen 151, and when limiting of output of at least one region of the reproduction screen 10 is input, list information 10' related to the at least one region may be output. The control unit 180 may control the touch screen 151 to display objects 14 and 15 indicating external terminals for outputting summary information corresponding to a region selected from the list information, together with the list information 10'.

Here, as illustrated in the second drawing of FIG. 7A, in a case in which an input applied to a thumbnail image corresponding to one region included in the list information 10' is continuously applied to the object 14 of any one external terminal, the control unit 180 may form the control command for outputting the summary information corresponding to the one region on the external terminal corresponding to the object 14. In detail, the control command may be a command for forming the summary information on the basis of video data extracted from the one region and controlling the wireless communication unit 110 to be wirelessly connected with the external terminal to transmit the summary information.

Thereafter, when the touch is released, the control unit 180 may control the touch screen 151 to terminate outputting of the reproduction screen 10. Also, the summary information 11' may be output on the display unit 351 of the external terminal 300 on the basis of the control command.

In this manner, even though outputting of the reproduction screen is terminated, the control unit 180 may transmit video data output in the selected region to the external terminal 300 wirelessly connected to the mobile terminal over time. Thus, the user may be continuously provided with information regarding the selected region through the external terminal 300 (for example, a wearable terminal that may be worn on at least a portion of the user's body) in a situation in which the mobile terminal 100 is not available to be used.

Meanwhile, the control unit 180 may transmit summary information corresponding to the selected region to the external terminal on the basis of the preset condition.

That is, referring to FIG. 7B, the mobile terminal 100 may include a sensor (for example, the camera 121) able to detect whether the user views the reproduction screen while the reproduction screen is being output on the touch screen 151. While the reproduction screen 10 is being output on the touch screen 151, the control unit 180 may sense the user's eyes with respect to the reproduction screen 10 by using the camera 121 and analyze detection data of the user's eyes.

If the user's eyes are not detected by the camera 121 as illustrated in the second drawing of FIG. 7B, the control unit 180 may transmit the summary information to the external terminal 300 on the basis of the detection data of the user eyes. That is, as illustrated in the third drawing of FIG. 7B, the summary information 11' corresponding to the selected region 11 may be output on the display unit 351 of the external terminal 300.

Although not shown, when the user's eyes are not detected, the control unit 180 may store the summary information corresponding to the selected region in this manner. Also the control unit 180 may transmit the summary information together with the detection data of the user's eyes to the external terminal. Thus, even when the user cannot view the reproduction screen in a state in which an input for limiting output regarding at least one region of the reproduction screen is not applied, the user may be provided with convenience of checking contents regarding the summary information formed in relation to the selected region.

Meanwhile, in a case in which the summary information is transmitted to the external terminal, the control unit 180 may output a control object for controlling an output state of the summary information in the external terminal, on the touch screen 151. Also, on the basis of a touch applied to the control object, the control unit 180 may transmit a control signal for determining an output state of the summary information to the external terminal. For example, the control signal may determine at least one of an output period of the summary information, an output amount of the summary information, and an output form of the summary information.

Figure 8A:
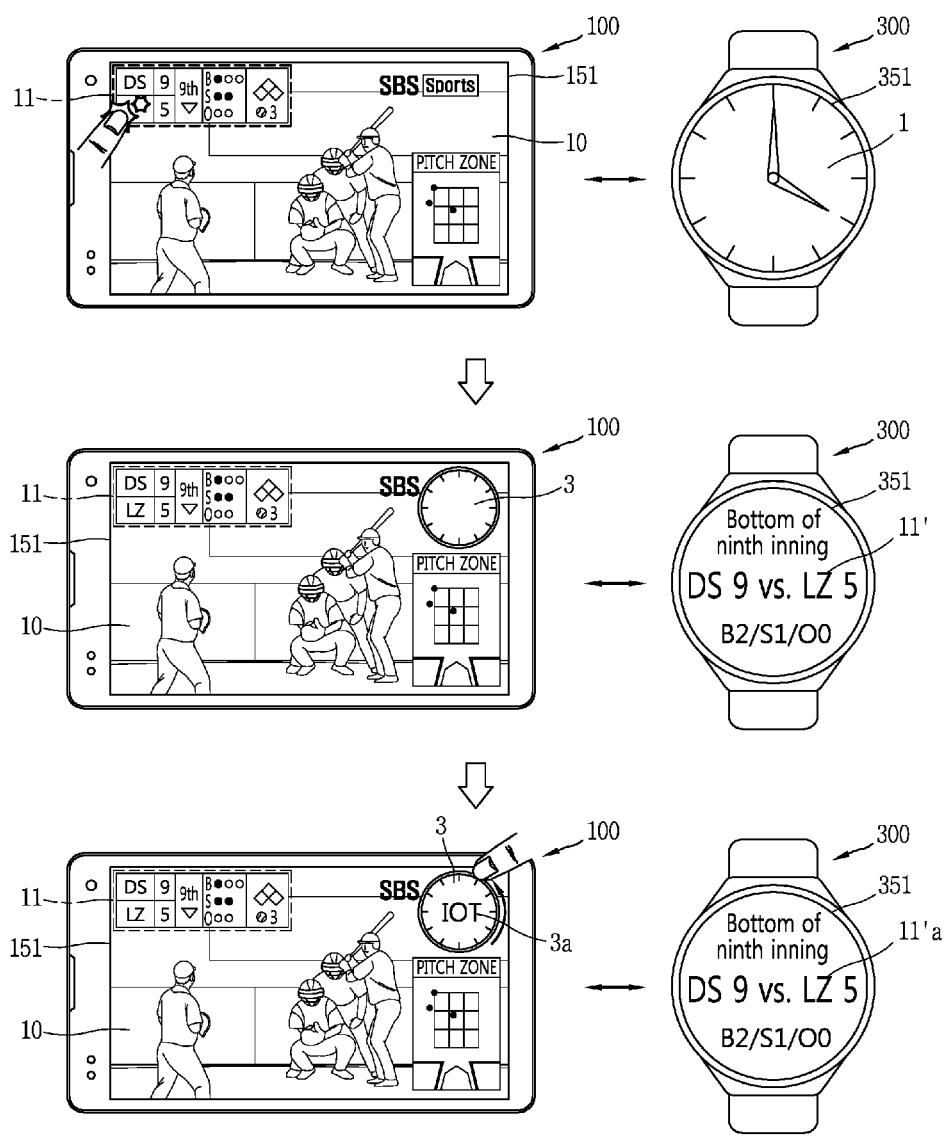
FIGS. 8A, 8B, and 8C are views illustrating embodiments related to controlling an output state of summary information in an external terminal using a control object.
Figure 8B:
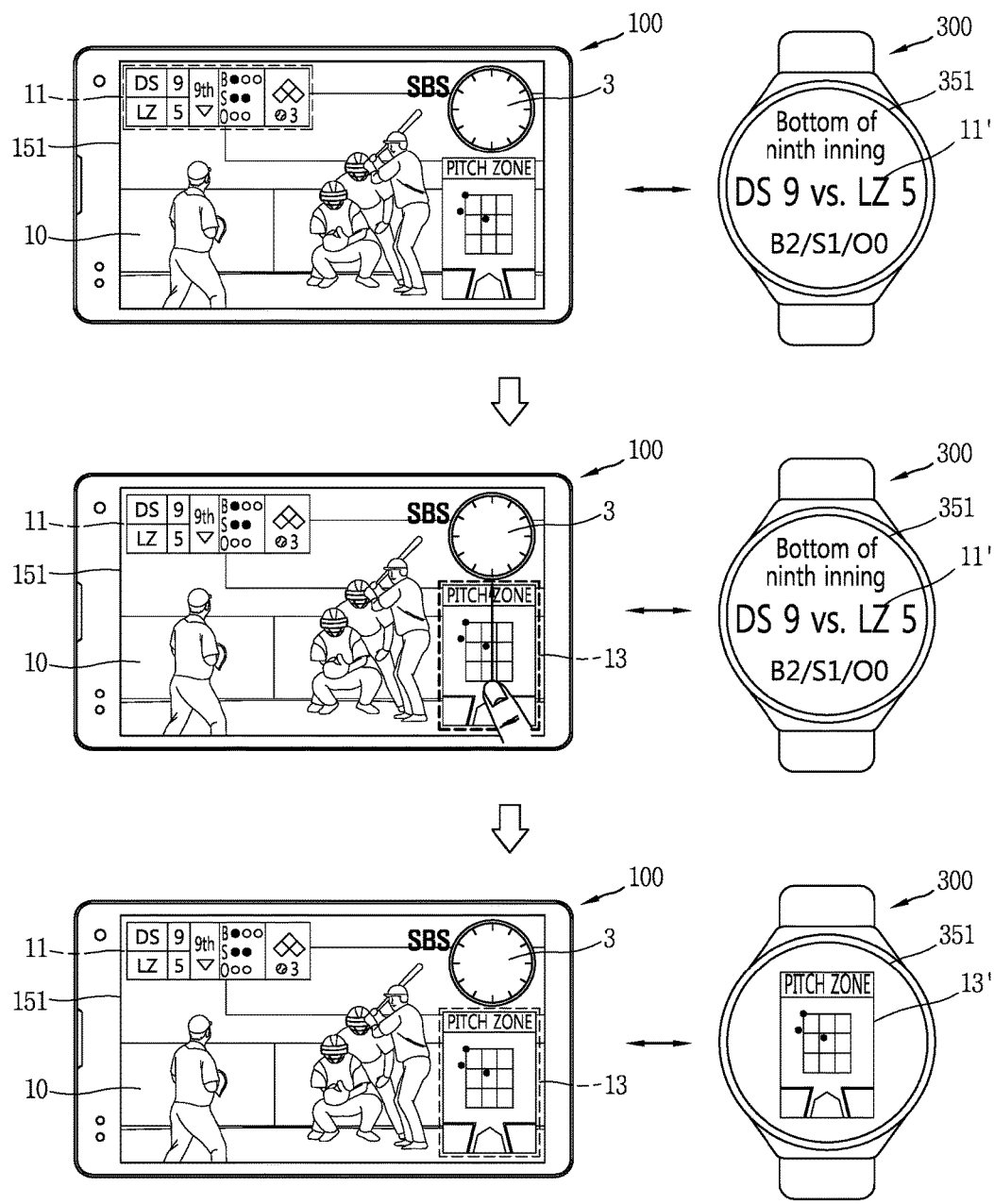
Figure 8C:
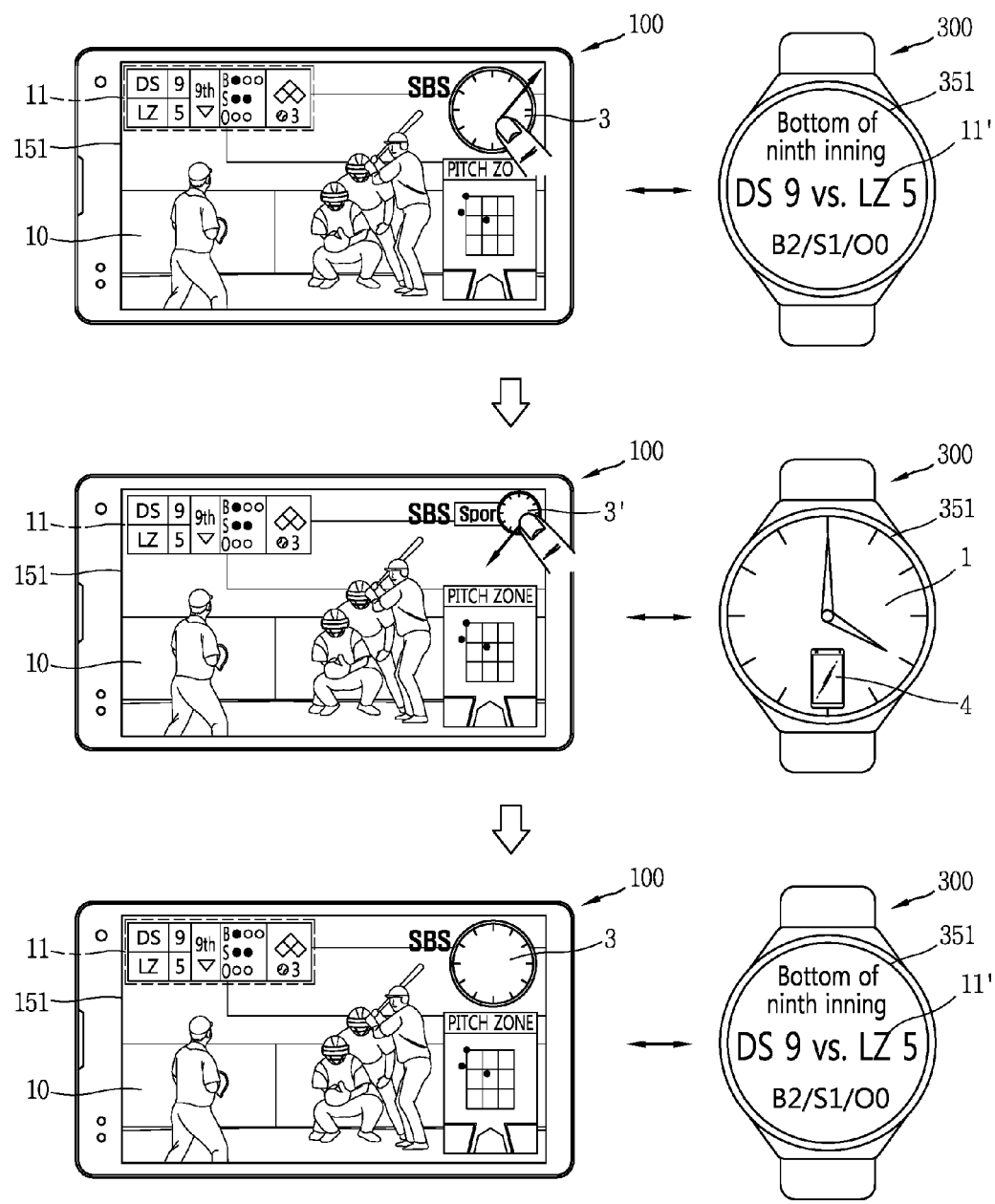

FIGS. 8A, 8B, and 8C are views illustrating embodiments related to controlling an output state of summary information in an external terminal using a control object.

First, referring to FIG. 8A, when a preset touch is applied to a region 11 selected from the reproduction screen 10 output on the touch screen 151, the control unit 180 may extract video data from the selected region 11. Also, the control unit 180 may form summary information corresponding to the extracted video data and subsequently form a control command for transmitting the summary information to the external terminal 300.

When the summary information 11' is output on the external terminal 300 on the basis of the control command, the control unit 180 may control the touch screen 151 to output a control object 3 corresponding to the external terminal 300 on the touch screen 151 as illustrated in the second drawing of FIG. 8A. Also, the control unit 180 may control an output state of the summary information 11' in the external terminal 300 on the basis of a touch applied to the control object 3.

For example, as illustrated in the third drawing of FIG. 8A, when a drag touch continued in a preset direction (for example, a counterclockwise direction) is applied to the control object 3, an output period of the summary information 11' may be set to correspond to a degree to which the drag touch is applied. Also, information 3a regarding the output period may be output on the control object 3.

When the output period is set on the basis of the touch applied to the control object 3 in this manner, the control unit 180 may control the wireless communication unit 110 to transmit a control signal including the information regarding the output period to the external terminal 300. Thus, summary information 11'a changed from the previously output summary information 11' after the lapse of the output period 10T may be output on the external terminal 300.

In another example, the control unit 180 may change the selected region on the basis of a touch applied to the control object and transmit summary information corresponding to the changed region to the external terminal.

That is, when a first region is selected from a plurality of preset regions included in the reproduction screen, the control unit 180 may form a control command for transmitting summary information corresponding to the video data extracted from the first region to the external terminal. Also, when a specific touch is applied to the control object, the control unit 180 may control the wireless communication unit 110 to transmit a control signal for outputting summary information corresponding to a second region different from the first region among the plurality of preset regions, instead of the summary information corresponding to the first region, to the external terminal.

For example, referring to FIG. 8B, the summary information 11' corresponding to the one region 11 in the touch screen 151 is output on the external terminal 300, and the control object 3 corresponding to the external terminal 300 may be output in one region of the touch screen 151.

Thereafter, as illustrated in the second drawing of FIG. 8B, when a specific touch is applied to a region 13 different from the one region 11 and to the control object 3 in the reproduction screen 10, the control unit 180 may change and set the different region 13 as a selected region.

Also, the control unit 180 may transmit a control signal for outputting summary information corresponding to the video data extracted from the different region, instead of the summary information corresponding to the video data extracted from the one region 11 to the external terminal 300.

Thus, as illustrated in the third drawing of FIG. 8B, summary information 13' corresponding to the video data extracted from the different region 13 may be output on the external terminal 300. Also, the control unit 180 may control the touch screen 151 such that the selected region and the changed region are differentiated.

That is, as illustrated in the first drawing of FIG. 8B, when the one region 11 is determined as the selected region, the control unit 180 may control the touch screen 151 to display the one region 11 to be differentiated (for example, to provide a visual effect such that the one region 11 is framed in the dotted line) in the reproduction screen. Thereafter, when the selected region is changed from the one region 11 to the different region 13, the control unit 180 may control the touch screen 151 to display the different region 13 to be differentiated in the reproduction screen 10 as illustrated in the third drawing of FIG. 8B.

Also, the controller 180 may temporarily stop transmission of the summary information on the basis of a touch applied to the control object. That is, as illustrated in the first drawing of FIG. 8C, in a case in which a touch is applied from the control object 3 in a direction toward the edge of the touch screen 151, the control unit 180 may stop formation of the control command such that transmission of the summary information is stopped.

In this case, outputting of the summary information received from the mobile terminal 100 on the display unit 351 of the external terminal 300 may be stopped, and as illustrated in the second drawing of FIG. 8C, an object 4 corresponding to the mobile terminal may be displayed.

Thereafter, as illustrated in the second drawing of FIG. 8C, when a touch is applied in a direction from the reduced control object 3 in the edge region of the touch screen 151 toward the center of the touch screen 151, the control unit 180 may form the control command again by using video data extracted from the selected region 11.

Thus, as illustrated in the third drawing of FIG. 8C, summary information 11' corresponding to the video data extracted from the selected region 11 may be output again on the external terminal 300.

In this manner, since the external provides the control object for controlling an output state of the summary information to the mobile terminal, the user may easily control an output state of the summary information through the mobile terminal.

Meanwhile, in a case in which the summary information is output on the external terminal, an output state of the mobile terminal may be controlled on the basis of an input applied to the external terminal.

Figure 9A:
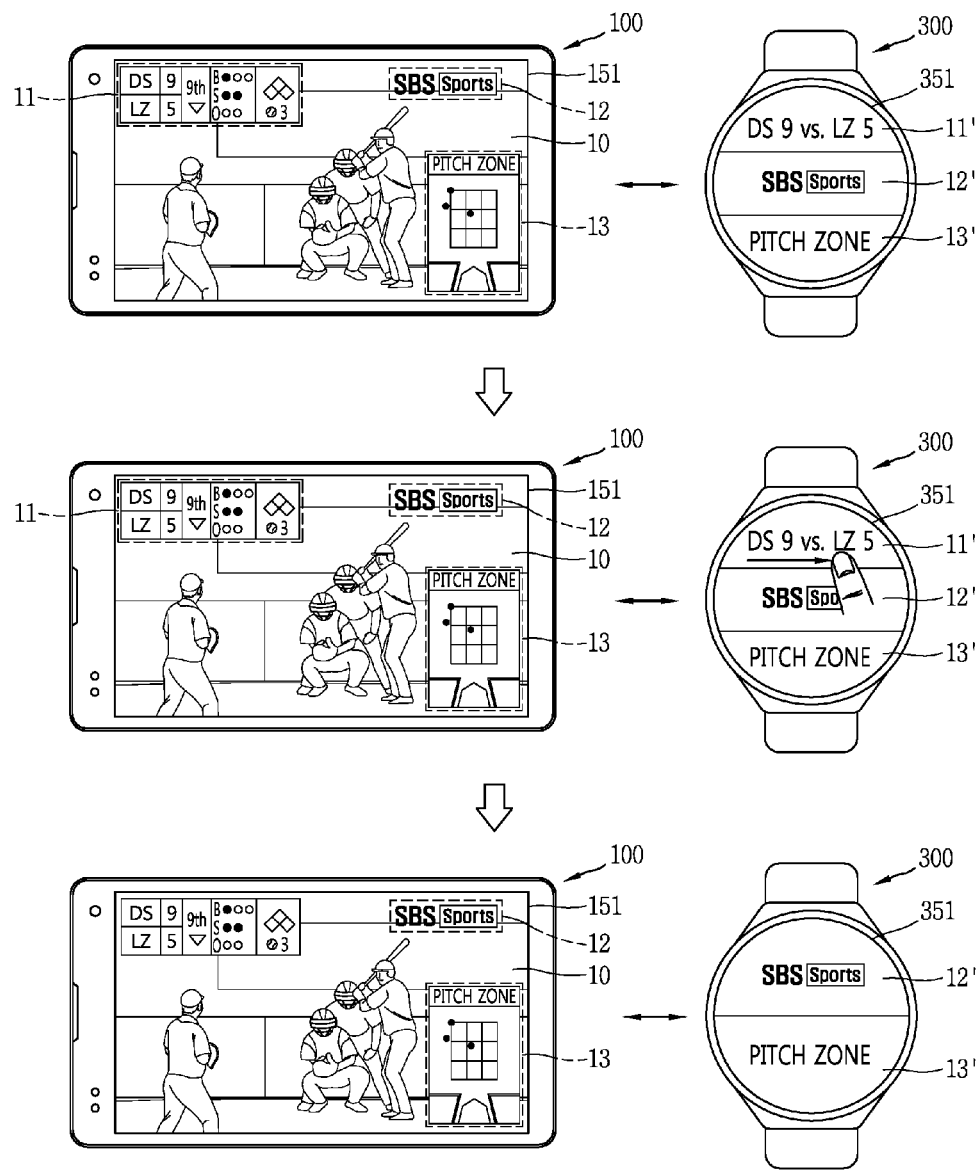
FIGS. 9A and 9B are views illustrating embodiments related to controlling of an output state of a mobile terminal on the basis of an input applied to an external terminal.
Figure 9B:
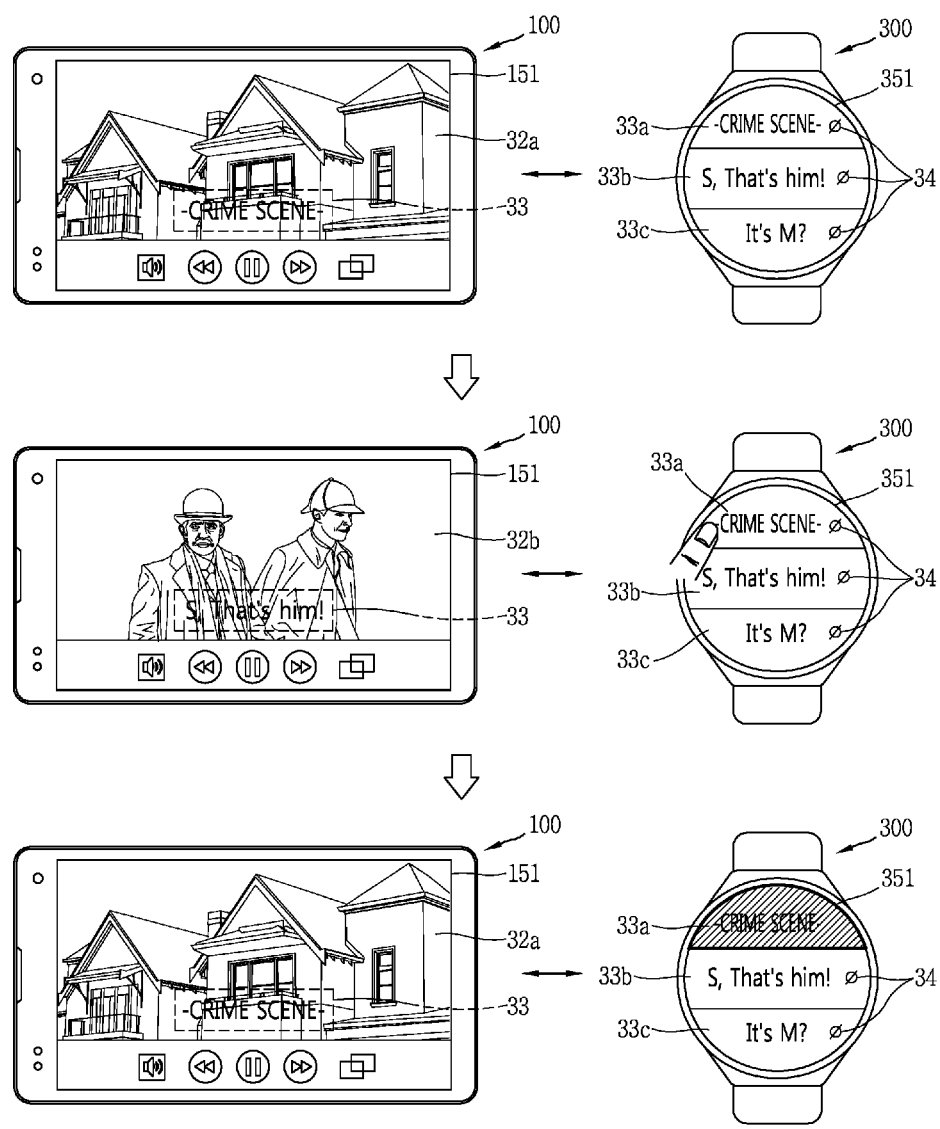

FIGS. 9A and 9B are views illustrating embodiments related to controlling of an output state of a mobile terminal on the basis of an input applied to an external terminal.

First, referring to FIG. 9A, the control unit 180 may determine a plurality of regions in the reproduction screen 10, as selected regions, and may transmit a plurality of pieces of summary information corresponding to video data respectively extracted from the plurality of regions to the external terminal 300. In this case, pieces of summary information 11', 12', and 13' respectively corresponding to the plurality of regions 11, 12, and 13 may be output on the display unit 351 of the external terminal 300.

In this state, as illustrated in the second drawing of FIG. 9A, in a case in which a preset touch is applied to any one summary information 11', the external terminal 300 may transmit a control command for releasing setting of the selected region regarding the summary information to the mobile terminal 100 on the basis of the preset touch.

In this case, as illustrated in the third drawing of FIG. 9A, outputting of the summary information 11' to which the preset touch has been applied may be terminated in the external terminal 300. Also, on the basis of reception of the control command, the control unit 180 may release setting of the selected region with respect to the one region 11 among the plurality of regions 11, 12, and 13 by using the summary information included in the control command. Also, the control unit 180 may control the touch screen 151 such that display of discrimination of the one region 11 disappears from the touch screen 151.

In this manner, the control unit 180 may release or change setting of the selected region in the mobile terminal 100 according to a control command received on the basis of a touch applied in the external terminal 300. Thus, the user may select or change his or her desired region among at least one region of the reproduction screen output on the mobile terminal 100 by applying various inputs to the external terminal 300.

Also, when specific summary information is selected in the external terminal, the control unit 180 may control the touch screen 151 such that a reproduction screen corresponding to the specific summary information is output on the touch screen 151.

That is, referring to FIG. 9B, a reproduction screen 32a corresponding to one video data is output on the touch screen 151, and a region in which visual information (for example, caption information) is changed over time may be set as the selected region 33 in the reproduction screen 32a.

Also, the control unit 180 may control the wireless communication unit 110 such that summary information (for example, text information corresponding to caption contents) corresponding to visual information output in the selected region 33 over time is transmitted to the external terminal 300. Thus, pieces of summary information 33a, 33b, and 33c continuously transmitted over time may be output on the display unit 351 of the external terminal 300.

Also, information 34 regarding a state of the user may be displayed in each of the pieces of the summary information 33a, 33b, and 33c. Here, the information regarding the state of the user may be information such as user's eyes detection data information indicating whether the user is viewing or information indicating whether a specific touch (for example, a touch input for checking specific information) has been applied to the summary information output on the external terminal 300.

In this state, as illustrated in the second drawing of FIG. 9B, in a case in which a specific touch of the user is applied to one summary information 33a among the pieces of summary information 33a, 33b, and 33c output on the external terminal 300, the external terminal 300 may transmit a command requesting output of video data corresponding to the one summary information 33a to the mobile terminal 100.

Thus, on the basis of reception of the output request command, the mobile terminal 100 may control the touch screen 151 such that the reproduction screen 32a corresponding to the output request command is output in the one reproduction screen 32b as illustrated in the second drawing of FIG. 9B.

Also, when an output state of the reproduction screen is changed in the mobile terminal 100, state information of the user regarding the one summary information 33a may not be output in the external terminal 300.

In this manner, when the user, who has received summary information through the external terminal, wants to output specific video data related to any one summary information, the video data may be provided through a larger screen.

As described above, in the mobile terminal and the control method thereof according to embodiments of the present disclosure, even when outputting of a reproduction screen corresponding to video data is limited, information included in an interested region selected by the user from the reproduction screen may be continuously provided to the user.

Thus, even in a situation in which the user cannot continuously reproduce the video data, the user may continuously check information regarding his or her interested region of the reproduction screen.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touch screen;
a user input unit;
a wireless communication unit;
a camera; and
a controller configured to cause the touch screen to:
display an image corresponding to video data, the image including a plurality of regions, wherein the plurality of regions comprise at least one of a preset region or a region set by a user;
display a list comprising items individually corresponding to one of the plurality of regions in response to a user input received via the user input unit while the image is displayed;
terminate the displaying of the image in response to selection of an item of the list that corresponds to one region among the plurality of regions; and
display summary information for the one region after the terminating of the displaying of the image,
wherein the controller is further configured to cause the wireless communication unit to transmit a control signal for displaying the summary information to an external terminal when a user's eye is not detected by the camera such that the summary information is displayed at the external terminal in response to the control signal.

2. The mobile terminal of claim 1, wherein:
when the image is displayed, the image is generated by streaming of the video data in real time based on a broadcast signal received from an external server; and
when the summary information is displayed, the summary information is updated in real time.

3. The mobile terminal of claim 1,
wherein the summary information is displayed on the touch screen while a different image is displayed on the touch screen.

4. The mobile terminal of claim 1, wherein the controller is further configured to cause the touch screen to display an object representing the external terminal when the list is displayed and prior to the displaying of the summary information at the external terminal.

5. The mobile terminal of claim 4, wherein the controller is further configured to cause the wireless communication unit to transmit the control signal to the external terminal in response to a touch applied to the object even when the user's eye is detected by the camera.

6. The mobile terminal of claim 1, wherein the controller is further configured to cause the touch screen to terminate the displaying of the summary information when the summary information is displayed at the external terminal.

7. The mobile terminal of claim 5, wherein the controller is further configured to:
cause the wireless communication unit to transmit a first control signal for displaying summary information corresponding to a first region selected from among the plurality of regions to the external terminal; and
cause the wireless communication unit to transmit a second control signal for displaying summary information corresponding to a second region selected from among the plurality of regions, instead of the first control signal, to the external terminal in response to a touch applied to the object and the second region while the summary information corresponding to the first region is displayed at the external terminal.

8. The mobile terminal of claim 1, wherein the controller is further configured to generate the summary information by at least:
extracting a portion of the video data corresponding to the one region corresponding to the selected item; or
changing an attribute of visual information corresponding to the extracted portion of the video data.

9. The mobile terminal of claim 8, wherein:
the summary information comprises a graphic object including at least a portion of the visual information; and
content of the summary information is changeable according to a size of the one region that is changed in response to a touch input received via the touch screen.

10. The mobile terminal of claim 9, wherein the controller is further configured to cause the touch screen to display the graphic object at a position on the touch screen corresponding to a position of the one region in the image, a size of the graphic object that is displayed while the image is not displayed corresponding to a size of the one region.

11. The mobile terminal of claim 9, wherein the controller is further configured to:
execute a first function while the image is not displayed;
cause the touch screen to display a first execution screen corresponding to the executed first function such that the graphic object is displayed on the first execution screen;
execute a second function while the image is not displayed; and
cause the touch screen to continue the displaying of the graphic object on a second execution screen corresponding to the executed second function when the first execution screen is changed to the second execution screen.

12. The mobile terminal of claim 11, wherein the controller is further configured to control the displaying of the graphic object based on a preset period of time such that the graphic object is displayed or not displayed periodically while the first execution screen or the second execution screen is displayed.

13. The mobile terminal of claim 12, wherein the controller is further configured to cause the touch screen to redisplay the graphic object when the summary information is changed while the first execution screen or the second execution screen is displayed and while the graphic object is not displayed, the redisplayed graphic object including content that is different from content of the previously displayed graphic object.

14. The mobile terminal of claim 9, wherein the controller is further configured to cause the touch screen to redisplay the image in response to a touch input applied to the graphic object, the redisplayed image corresponding to a section of the video data that is reproduced in real time at a time point when the touch input has been applied.

15. A method for controlling a mobile terminal, the method comprising:
  displaying an image corresponding to video data on a touch screen, the image including a plurality of regions, wherein the plurality of regions comprise at least one of a preset region or a region set by a user;
  displaying a list comprising items individually corresponding to one of the plurality of regions in response to a user input received via a user input unit while the image is displayed;
  terminating the displaying of the image in response to selection of an item of the list that corresponds to one region among the plurality of regions;
  displaying summary information for the one region after the terminating of the displaying of the image; and
  transmitting, via a wireless communication unit, a control signal for displaying the summary information to an external terminal when a user's eye is not detected by a camera such that the summary information is displayed at the external terminal in response to the control signal.

16. The method of claim 15, wherein:
  when the image is displayed, the image is generated by streaming of the video data in real time based on a broadcast signal received from an external server; and
  when the summary information is displayed, the summary information is updated in real time.

17. The method of claim 15,
  wherein the summary information is displayed on the touch screen while a different image is displayed on the touch screen.

18. The method of claim 15, wherein the summary information is information generated by at least:
  extracting a portion of the video data corresponding to the one region corresponding to the selected item; or
  changing an attribute of visual information corresponding to the extracted portion of the video data.

19. The method of claim 18, wherein:
  the summary information comprises a graphic object including at least a portion of the visual information; and
  content of the summary information is changeable according to a size of the one region that is changed in response to a touch input received via the touch screen.

* * * * *